US009165257B2

(12) United States Patent
Badger et al.

(10) Patent No.: US 9,165,257 B2
(45) Date of Patent: Oct. 20, 2015

(54) TYPING ASSISTANCE FOR EDITING

(75) Inventors: Eric Norman Badger, Issaquah, WA (US); Drew Elliott Linerud, Duvall, WA (US); Itai Almog, Redmond, WA (US); Timothy S. Paek, Sammamish, WA (US); Parthasarathy Sundararajan, Bellevue, WA (US); Kenneth R. Walters, Brier, WA (US); Andrew Douglas Peterson, Bothell, WA (US); Shawna Julie Davis, Seattle, WA (US); Tirthankar Sengupta, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 25 days.

(21) Appl. No.: 12/784,374

(22) Filed: May 20, 2010

(65) Prior Publication Data
US 2011/0202836 A1 Aug. 18, 2011

Related U.S. Application Data

(60) Provisional application No. 61/304,341, filed on Feb. 12, 2010.

(51) Int. Cl.
G06F 3/0488 (2013.01)
G06N 99/00 (2010.01)
(Continued)

(52) U.S. Cl.
CPC ............ *G06N 99/005* (2013.01); *G06F 3/0237* (2013.01); *G06F 3/04886* (2013.01); *G06F 17/276* (2013.01); *G06F 17/2795* (2013.01)

(58) Field of Classification Search
CPC .................... G06F 3/04886; G06F 17/243
USPC .......... 715/773, 780; 345/156, 168, 169, 179, 345/173
See application file for complete search history.

(56) References Cited

U.S. PATENT DOCUMENTS 5,748,512 A 5/1998 Vargas
5,896,321 A 4/1999 Miller et al.
(Continued)

FOREIGN PATENT DOCUMENTS

CN 1442787 A 9/2003
CN 1542596 A 11/2004
(Continued)

OTHER PUBLICATIONS

9TO5Mac, http://www.9to5mac.com/ipad-spell-check-thesaurus-4323967, 4 pages (document marked Feb. 10, 2010, downloaded on May 18, 2010).
(Continued)

*Primary Examiner* — Rashawn Tillery
(74) *Attorney, Agent, or Firm* — Aaron Chatterjee; Kate Drakos; Micky Minhas

(57) ABSTRACT

Apparatus and methods are disclosed for providing feedback and guidance to touch screen device users to improve the text entry user experience and performance. According to one embodiment, a method comprises receiving a text entry, receiving input on a touch screen in the form of a first single touch input located over a word of previously entered text, and presenting the user with one or more suggestion candidates indicated possible replacement words related to the selected word. The user can then select one of the suggestion candidates using a second single touch input to replace the selected word with a word associated with the selected suggestion candidate.

22 Claims, 19 Drawing Sheets

(51) Int. Cl.
*G06F 3/023* (2006.01)
*G06F 17/27* (2006.01)

(56) References Cited

U.S. PATENT DOCUMENTS

| | | | |
|---|---|---|---|
| 6,282,507 B1* | 8/2001 | Horiguchi et al. | 704/3 |
| 6,377,965 B1 | 4/2002 | Hachamovitch et al. | |
| 6,421,655 B1 | 7/2002 | Horvitz et al. | |
| 6,490,698 B1 | 12/2002 | Horvitz et al. | |
| 6,556,841 B2* | 4/2003 | Yu | 455/556.1 |
| 6,573,844 B1 | 6/2003 | Venolia et al. | |
| 6,646,572 B1 | 11/2003 | Brand | |
| 6,654,733 B1 | 11/2003 | Goodman et al. | |
| 6,798,887 B1 | 9/2004 | Andre | |
| 6,801,190 B1 | 10/2004 | Robinson et al. | |
| 6,931,384 B1 | 8/2005 | Horvitz et al. | |
| 6,989,822 B2 | 1/2006 | Pettiross et al. | |
| 7,030,863 B2 | 4/2006 | Longe et al. | |
| 7,088,345 B2 | 8/2006 | Robinson et al. | |
| 7,103,544 B2 | 9/2006 | Mahajan et al. | |
| 7,106,312 B2 | 9/2006 | Pennington, II et al. | |
| 7,117,153 B2 | 10/2006 | Mahajan et al. | |
| 7,119,794 B2 | 10/2006 | Kong | |
| 7,120,477 B2 | 10/2006 | Huang | |
| 7,149,970 B1* | 12/2006 | Pratley et al. | 715/257 |
| 7,171,353 B2 | 1/2007 | Trower, II et al. | |
| 7,200,267 B1 | 4/2007 | Bennett et al. | |
| 7,254,774 B2 | 8/2007 | Cucerzan et al. | |
| 7,277,088 B2 | 10/2007 | Robinson et al. | |
| 7,293,231 B1 | 11/2007 | Gunn et al. | |
| 7,313,516 B2 | 12/2007 | Oshima | |
| 7,319,957 B2 | 1/2008 | Robinson et al. | |
| 7,350,145 B2 | 3/2008 | Wolpe | |
| 7,370,275 B2 | 5/2008 | Haluptzok et al. | |
| 7,406,662 B2 | 7/2008 | Seto et al. | |
| 7,443,316 B2 | 10/2008 | Lim | |
| 7,453,439 B1 | 11/2008 | Kushler et al. | |
| 7,458,029 B2 | 11/2008 | Agrawala et al. | |
| 7,461,059 B2 | 12/2008 | Richardson et al. | |
| 7,477,233 B2 | 1/2009 | Duncan et al. | |
| 7,506,254 B2 | 3/2009 | Franz | |
| 7,508,324 B2 | 3/2009 | Suraqui | |
| 7,561,145 B2 | 7/2009 | Garside et al. | |
| 7,574,672 B2 | 8/2009 | Jobs et al. | |
| 7,580,908 B1 | 8/2009 | Horvitz et al. | |
| 7,580,925 B2 | 8/2009 | Unruh et al. | |
| 7,616,191 B2 | 11/2009 | Matta | |
| 7,620,631 B2 | 11/2009 | Paek et al. | |
| 7,630,980 B2 | 12/2009 | Parikh | |
| 7,634,720 B2 | 12/2009 | Haluptzok et al. | |
| 7,689,420 B2 | 3/2010 | Paek et al. | |
| 7,694,231 B2 | 4/2010 | Kocienda et al. | |
| 7,701,449 B2 | 4/2010 | Pettiross et al. | |
| 7,707,131 B2 | 4/2010 | Chickering et al. | |
| 7,793,228 B2 | 9/2010 | Mansfield et al. | |
| 8,010,465 B2 | 8/2011 | Badger et al. | |
| 8,782,556 B2 | 7/2014 | Badger et al. | |
| 2003/0214539 A1 | 11/2003 | Iwema et al. | |
| 2004/0021691 A1 | 2/2004 | Dostie et al. | |
| 2004/0183833 A1 | 9/2004 | Chua | |
| 2004/0217944 A1* | 11/2004 | Kong | 345/173 |
| 2005/0024324 A1 | 2/2005 | Tomasi et al. | |
| 2005/0099406 A1* | 5/2005 | Pettiross et al. | 345/179 |
| 2005/0099407 A1 | 5/2005 | Pennington, II et al. | |
| 2005/0099408 A1 | 5/2005 | Seto et al. | |
| 2005/0149882 A1 | 7/2005 | Iwema et al. | |
| 2005/0283726 A1* | 12/2005 | Lunati | 715/533 |
| 2006/0007190 A1 | 1/2006 | Pettiross et al. | |
| 2006/0073818 A1* | 4/2006 | Scott | 455/418 |
| 2006/0206815 A1* | 9/2006 | Pathiyal et al. | 715/533 |
| 2006/0209014 A1 | 9/2006 | Duncan et al. | |
| 2006/0210958 A1 | 9/2006 | Rimas-Ribikauskas et al. | |
| 2006/0235700 A1 | 10/2006 | Wong et al. | |
| 2006/0256139 A1 | 11/2006 | Gikandi | |
| 2006/0265668 A1* | 11/2006 | Rainisto | 715/816 |
| 2006/0274051 A1 | 12/2006 | Longe et al. | |
| 2006/0282575 A1 | 12/2006 | Schultz et al. | |
| 2007/0005670 A1 | 1/2007 | Pennington et al. | |
| 2007/0036292 A1 | 2/2007 | Selbie et al. | |
| 2007/0040813 A1* | 2/2007 | Kushler et al. | 345/173 |
| 2007/0089070 A1 | 4/2007 | Jaczyk | |
| 2007/0233497 A1 | 10/2007 | Paek et al. | |
| 2007/0239453 A1 | 10/2007 | Paek et al. | |
| 2007/0239454 A1 | 10/2007 | Paek et al. | |
| 2008/0072143 A1 | 3/2008 | Assadollahi | |
| 2008/0133220 A1 | 6/2008 | Paek et al. | |
| 2008/0136785 A1 | 6/2008 | Baudisch et al. | |
| 2008/0189605 A1 | 8/2008 | Kay et al. | |
| 2008/0195388 A1 | 8/2008 | Bower et al. | |
| 2008/0195571 A1 | 8/2008 | Furuuchi et al. | |
| 2008/0243834 A1 | 10/2008 | Rieman et al. | |
| 2008/0291325 A1 | 11/2008 | Teegan et al. | |
| 2008/0294982 A1 | 11/2008 | Leung et al. | |
| 2009/0006100 A1 | 1/2009 | Badger et al. | |
| 2009/0009367 A1 | 1/2009 | Hirshberg | |
| 2009/0009494 A1 | 1/2009 | Lee | |
| 2009/0054123 A1 | 2/2009 | Mityagin et al. | |
| 2009/0100340 A1 | 4/2009 | Paek et al. | |
| 2009/0150322 A1 | 6/2009 | Bower et al. | |
| 2009/0150341 A1 | 6/2009 | Paek et al. | |
| 2009/0182552 A1* | 7/2009 | Fyke et al. | 704/9 |
| 2009/0195506 A1 | 8/2009 | Geidl et al. | |
| 2009/0213134 A1* | 8/2009 | Stephanick et al. | 345/589 |
| 2009/0216690 A1 | 8/2009 | Badger et al. | |
| 2009/0225041 A1 | 9/2009 | Kida et al. | |
| 2009/0284471 A1 | 11/2009 | Longe et al. | |
| 2009/0287626 A1 | 11/2009 | Paek et al. | |
| 2009/0287680 A1 | 11/2009 | Paek et al. | |
| 2009/0287681 A1 | 11/2009 | Paek et al. | |
| 2009/0295737 A1 | 12/2009 | Goldsmith et al. | |
| 2009/0313572 A1 | 12/2009 | Paek et al. | |
| 2009/0313573 A1 | 12/2009 | Paek et al. | |
| 2009/0327977 A1 | 12/2009 | Bachfischer et al. | |
| 2010/0130236 A1 | 5/2010 | Sivadas et al. | |
| 2010/0156793 A1 | 6/2010 | Ozias et al. | |
| 2010/0164897 A1 | 7/2010 | Morin et al. | |
| 2010/0289757 A1* | 11/2010 | Budelli | 345/173 |
| 2010/0315266 A1 | 12/2010 | Gunawardana et al. | |
| 2011/0061017 A1 | 3/2011 | Ullrich et al. | |
| 2011/0201387 A1 | 8/2011 | Paek et al. | |
| 2011/0246575 A1 | 10/2011 | Murayama et al. | |
| 2011/0270786 A1 | 11/2011 | Badger et al. | |
| 2012/0019446 A1 | 1/2012 | Wu et al. | |
| 2014/0310213 A1 | 10/2014 | Badger et al. | |

FOREIGN PATENT DOCUMENTS

| | | |
|---|---|---|
| CN | 1670723 A | 9/2005 |
| CN | 101183281 A | 5/2008 |
| CN | 101369216 A | 2/2009 |
| CN | 101382866 A | 3/2009 |
| WO | WO 2008/120033 | 10/2008 |

OTHER PUBLICATIONS

Android Open Source Project, "Cupcake Development Branch," http://source.android.com/roadmap/cupcake, 5 pages (downloaded on May 18, 2010).

Apple Inc., "Introducing iPhone 3G," http://www.apple.com/iphone/, 1 page (downloaded on May 18, 2010).

Apple Inc., *iPad User Guide*, 145 pages (document marked 2010, downloaded on May 14, 2010).

Apple Inc., *iPhone User's Guide*, 130 pages, (document marked 2008, downloaded on May 14, 2010).

Beckett, "Undocumented Spell Check Features Found on the iPad/iPhone Alley," http://www.iphonealley.com/tips/undocumented-spell-check-features-found-on-the-ipad, 1 page, (document marked May 12, 2010, downloaded on May 14, 2010).

Chan, "HTC Hero: Software & HTC Sense review,", http://www.androidcentral.com/htc-hero-software-htc-sense-review, 16 pages (document marked Oct. 15, 2009, downloaded on May 18, 2010).

(56) References Cited

OTHER PUBLICATIONS

Chen et al., "An Empirical Study of Smoothing Techniques for Language Modeling," *Harvard University Technical report TR-10-98*, 63 pages (Aug. 1998).
Comfort Software Group, "Virtual On-Screen Keyboard for any Taste," http://hot-virtual-keyboard.com/, 1 page (document not dated, downloaded on Jan. 22, 2010).
Faraj et al., "BigKey: a virtual keyboard for mobile devices," *Proc. of Int'l HCI*, pp. 3-10 (2009).
Goodman et al., "Language Modeling for Soft Keyboards," *AAAI*, 6 pages (Edmonton, Canada, 2002).
Goodman et al., "Language Modeling for Soft Keyboards," *Microsoft Research Technical Report MSR-TR-2001-118*, 9 pages (Nov. 28, 2001).
Goodman et al., "Language Modeling for Soft Keyboards," *Proceedings of Intelligent User Interfaces 2002*, pp. 194-195 (San Francisco, Jan. 13-16, 2002).
Goodman et al., "The State of the Art in Language Modeling [Emphasis on Machine Translation]," *A tutorial presented at North American ACL*, 134 pages (Seattle, 2000).
Goodman et al., "The State of the Art in Language Modeling," *Tutorial Presented at AMTA*, 140 pages (Tiburon, Canada, 2002).
Goodman, "A bit of Progress in Language Modeling Extended Version," *Microsoft Research Technical Report MSR-TR-2001-72*, 73 pages (Aug. 2001).
Goodman, "Exponential priors for Maximum Entropy Models," *North American ACL*, 8 pages (2004).
Goodman, "Language Models for Handwriting," *International Workshop on Frontiers in Handwriting Recognition 2006*, 63 pages (2006).
Goodman, "Putting it all together: Language Model Combination," *ICASSP-2000*, 4 pages (Istanbul, Jun. 2000).
Grothaus, "iPhone OS 4.0: iPad-like spell check," *the Unofficial Apple Weblog*, http://www.tuaw.com/2010/04/08/iphone-os-4-0-ipad-like-spell-check/, 12 pages (document marked Apr. 8, 2010, downloaded May 18, 2010).
Gunawardana et al., "Usability Guided Key-Target Resizing for Soft Keyboards," *Proc. of the 14th Int'l Conf. on Intelligent User Interfaces*, pp. 111-118 (Hong Kong, Feb. 7-10, 2010).
iPadMe.Org, "Your latest iPad News and Technology Released Here," http://ipadme.org/get-the-apple-wireless-keyboard/, 4 pages (document marked Apr. 17, 2010, downloaded on May 18, 2010).
Katysovas, "A first look at Google Android," *Free University of Bolzano, Internet Technologies 2*, 28 pages (Jan. 19, 2008).
Kölsch et al., "Keyboards without Keyboards: A Survey of Virtual Keyboards," *University of California, Santa Barbara Technical Report 2002-21*, 8 pages (Jul. 12, 2002).
Mackenzie et al., "Text entry using soft keyboards," *Behaviour & Information Technology*, vol. 18, No. 4, pp. 235-244 (1999).
Magnien et al., "Mobile text input with soft keyboards: optimization by means of visual clues," *Proc. of MobileHCI*, pp. 337-341 (2004).
Malaysia Mobile Tech News, "Review: HTC Hero—Software [Updated]," 42 pages, (document marked Sep. 17, 2009, downloaded on Apr. 12, 2010).
Masui, "An Efficient Text Input Method for Pen-based Computers," *Proceedings of the ACM Conference on Human Factors in Computer Systems*, pp. 328-335 (Apr. 18-23, 1998).
Masui, "POBox: An efficient text input method for handheld and ubiquitous computers," *Lecture Notes in Computer Science*, vol. 1707, pp. 288-300 (H. Gellersen, ed. 1999).
Microsoft Corp., "Microsoft Technet: Resources for IT Professionals," http://technet.microsoft.com/en-us/library/ee692902(printer).aspx, 5 pages (document marked 2010, downloaded on May 18, 2010).
Microsoft Corp., "Type without using the keyboard (On-Screen Keyboard)," http://windows.microsoft.com/en-US/windows7/Type-without-using-the-keyboard-On-Screen-Keyboard, 3 pages (document marked 2010, downloaded on May 18, 2010).

Miniman, "Windows Phone 7 Series: Two cool Keyboard Features," http ://pocketnow.com/software-l/windows-phone-7-series-two-cool-keyboard-features, 3 pages (document marked Feb. 15, 2010, downloaded on May 18, 2010).
Paek et al., "Designing Phrase Builder: A Mobile Real-Time Query Expansion Interface," *MobileHCT'09*, 10 pages (Bonn, Germany, Sep. 15-18, 2009).
PDAMedia.biz, PDAmedia Keyboard V 2.0 user manual, 20 pages (Nov. 25, 2004).
Potter, et al., "Improving the Accuracy of Touch Screens: An Experimental Evaluation of Three Strategies," *Proc. of CHI*, pp. 27-32 (1988).
Redmond Pie, "Zune HD 4.3 Firmware Brings Support for Apps and 3D Games," http://www.redmondpie.com/zune-hd-4.3-firmware-brings-support-for-apps-and-3d-games-9140088/, 6 pages (document marked Nov. 7, 2009, downloaded on May 18, 2010).
SmartCell Technology, *TextPlus™ for Windows Mobile (Pocket PC), Version 1.1, Users Guide*, 18 pages (document marked 1999-2005).
Stocky et al., "A Commonsense Approach to Predictive Text Entry," *Proceedings of Conference on Human Factors in Computer Systems*, 4 pages (Apr. 24-29, 2004).
Technology and Integration, "Eurovocs Suite, A useful typing aid," 2 pages (document not dated, downloaded Jan. 22, 2010).
techshout.com, "Sony Ericsson builds-in Zi's eZiType Technology in the M600 Phone," http://www.techshout.com/mobile-phones/2006/28/sony-ericsson-builds-in-zis-ezitype-technology-in-the-m600-phone/, 2 pages (document marked May 28, 2006).
Verizon/Google™, *Droid User Guide*, Manual No. 68000202474-B, 58 pages (document marked 2010, downloaded on May 14, 2010).
Baudisch et al., "Phosphor: explaining transitions in the user interface using afterglow effects," *Proc. of the 19th Annual ACM Symposium on User Interface Software and Technology (UIST)*, pp. 169-178 (2006).
Brewster et al., "Tactile feedback for mobile interactions," *Proc. of the SIGCHI Conf. on Human Factors in Computing Systems*, pp. 159-162 (2007).
Brown et al., "Multidimensional Tactons for Non-visual Information Display in Mobile Devices," *Proc. of the 8th Conf. on Human-Computer Interaction with Mobile Devices and Services (MobileHCI)*, pp. 231-238 (2008).
Hoffmann et al., "TypeRight: A Keyboard with Tactile Error Prevention," *Proc. of the SIGCHI Conf. on Human Factors in Computing Systems*, pp. 2265-2268 (2009).
Hoggan et al., "Investigating the Effectiveness of Tactile Feedback for Mobile Touchscreens," *Proc. of the SIGCHI Conf. on Human Factors in Computing Systems*, pp. 1573-1582 (2008).
Kaaresoja et al., "Snap-Crackle-Pop: Tactile Feedback for Mobile Touch Screens," *Proc. of Eurohaptics*, pp. 565-566 (2006).
Kristensson, "Discrete and Continuous Shape Writing for Text Entry and Control," Ph.D. thesis, Linköping University, Sweden (2007) (215 pages).
Kristensson et al., "Relaxing Stylus Typing Precision by Geometric Pattern Matching," *Proceedings of the 10th Int'l Conf. on Intelligent User Interfaces (IUI)*, pp. 151-158 (2005).
Lee et al., "Haptic Pen: A Tactile Feedback Stylus for Touch Screens," *Proc. of the 17th Annual ACM Symposium on User Interface Software and Technology*, pp. 291-294 (2004).
Lee et al., "The Performance of Touch Screen Soft Buttons," *Proc. of the SIGCHI Conf. on Human Factors in Computing Systems*, pp. 309-318 (2009).
Lewis et al., "Task-Centered User Interface Design: A Practical Introduction," distributed via anonymous ftp (ftp.cs.colorado.edu) (1993) (190 pages).
Luk et al., "A Role for Haptics in Mobile Interaction: Initial Design Using a Handheld Tactile Display Prototype," *Proc. of the SIGCHI Conf. on Human Factors in Computing Systems*, pp. 171-180 (2006).
MacKenzie et al., "Eye Typing Using Word and Letter Prediction and a Fixation Algorithm," *Proc. Of the ACM Symposium on Eye Tracking Research and Applications—ETRA 2008*, pp. 55-58 (2008).
MacKenzie et al., "Phrase Sets for Evaluating Text Entry Techniques," *CHI 2003—Extended Abstracts on Human Factors in Computing Systems*, pp. 754-755 (2003).

(56) References Cited

OTHER PUBLICATIONS

Paek et al., "Multimodal Feedback and Guidance Signals for Mobile Touchscreen Keyboards," Microsoft Research Technical Report MSR-TR-2010-76, Jun. 2010 (10 pages).

Paek et al., "A Practical Examination of Multimodal Feedback and Guidance Signals for Mobile Touchscreen Keyboards," *Proc. of the 12th Int'l Conf. on Human Computer Interaction (Mobile HCI 2010)*, pp. 365-368 (Sep. 2010).

Rabin et al., "Tactile Feedback Contributes to Consistency of Finger Movements During Typing," *Experimental Brain Research*, vol. 155, No. 3, pp. 362-369 (2004).

Shannon, "Prediction and Entropy of Printed English," *Bell System Technical Journal*, pp. 50-64 (Jan. 1951).

Hinrichs, "Examination of text-entry methods for tabletop displays," 2nd IEEE International Workshop on Horizontal Interactive Human-Computer Systems, Tabletop 2007, Oct. 10-12, 2007, pp. 105-112.

MacKenzie et al., "Text entry for mobile computing: Models and methods, theory and practice," Human-Computer Interaction, 2002, vol. 17, pp. 147-198.

Rajeshkannan et al., ""Language localization for mobile phones," Proc. of the Conf. on Mobile and Pervasive Computing," CoMPC 2008, Aug. 7-8, 2008, pp. 52-55.

Sirisena, "Mobile text entry," Department of Computer Science, University of Canterbury, Christchurch, New Zealand, Nov. 8, 2002, pp. 1-41.

Soukoreff et al., "Theoretical upper and lower bounds on typing speed using a stylus and a soft keyboard," Behaviour & Information Technology, vol. 14, No. 6, 1995, pp. 370-379.

Notice on the First Office Action, China Patent App. No. 201110039868.9, Oct. 10, 2012, 10 pages (w/ partial English translation).

Notice on the Second Office Action, China Patent App. No. 201110039868.9, Jun. 20, 2013, 8 pages (w/ partial English translation).

Notice on the Final Office Action, China Patent App. No. 201110039868.9, Nov. 27, 2013, 6 pages (w/ partial English translation).

Notice on Reexamination, China Patent App. No. 201110039868.9, Aug. 15, 2014, 11 pages (w/ partial English translation).

Notice on Reexamination, China Patent App. No. 201110039868.9, Dec. 15, 2014, 10 pages (w/ partial English translation).

Decision on Reexamination, China Patent App. No. 201110039868.9, May 11, 2015, 17 pages (w/ partial English translation).

Non-Final Office Action dated Jun. 11, 2015, U.S. Appl. No. 12/753,744, 27 pages.

* cited by examiner

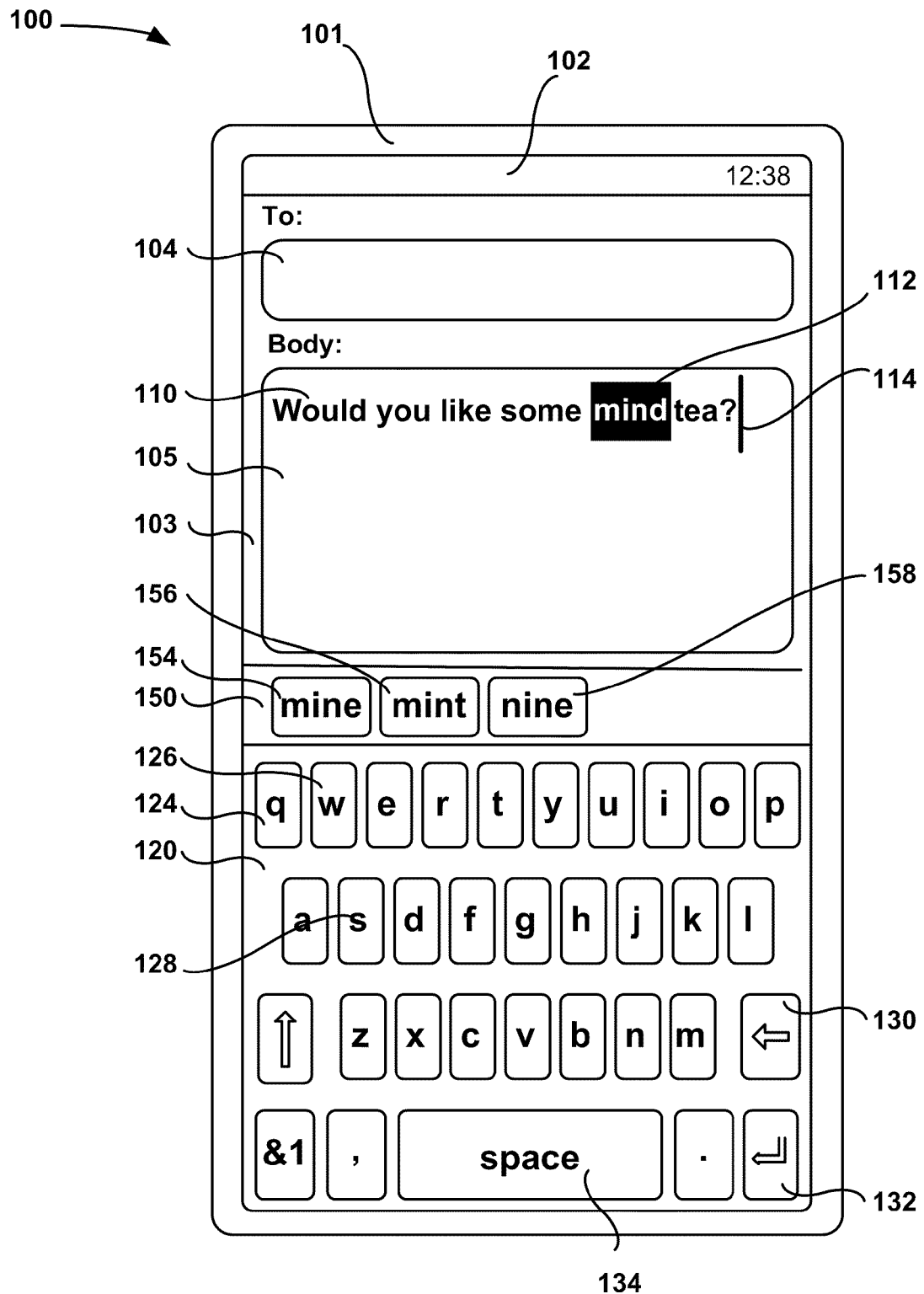

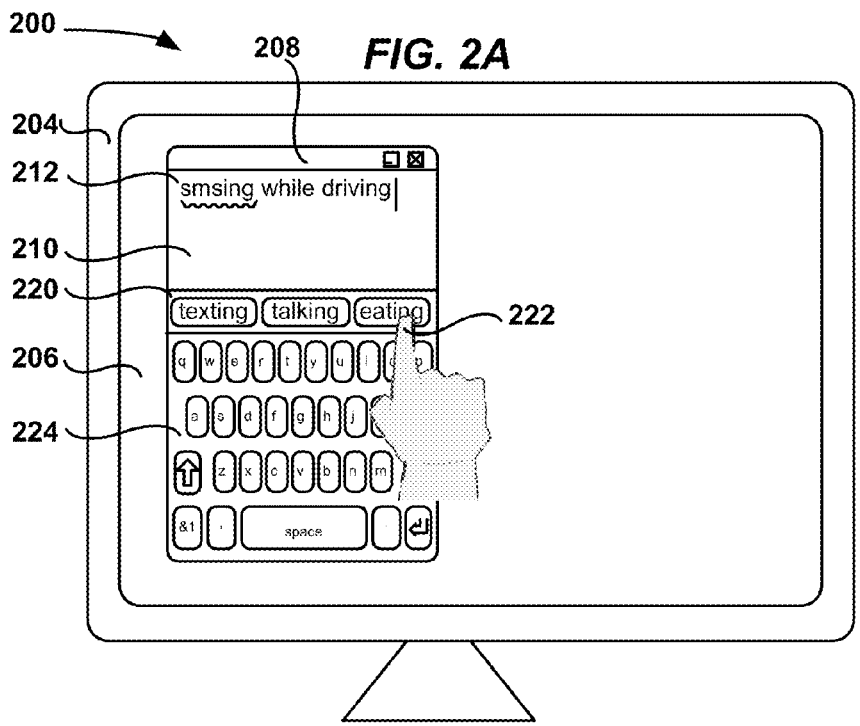
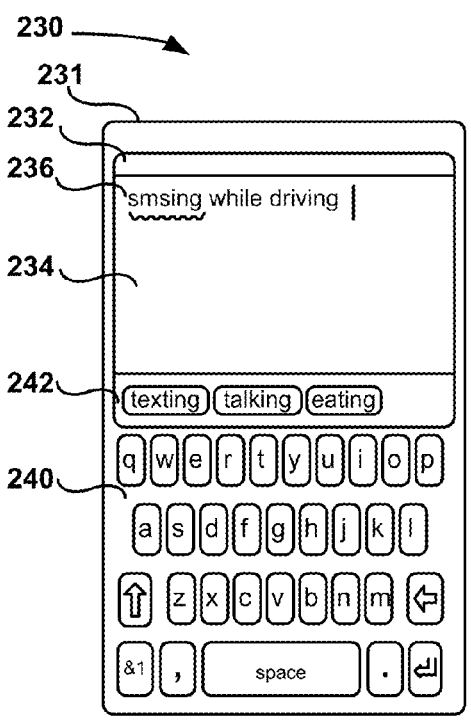
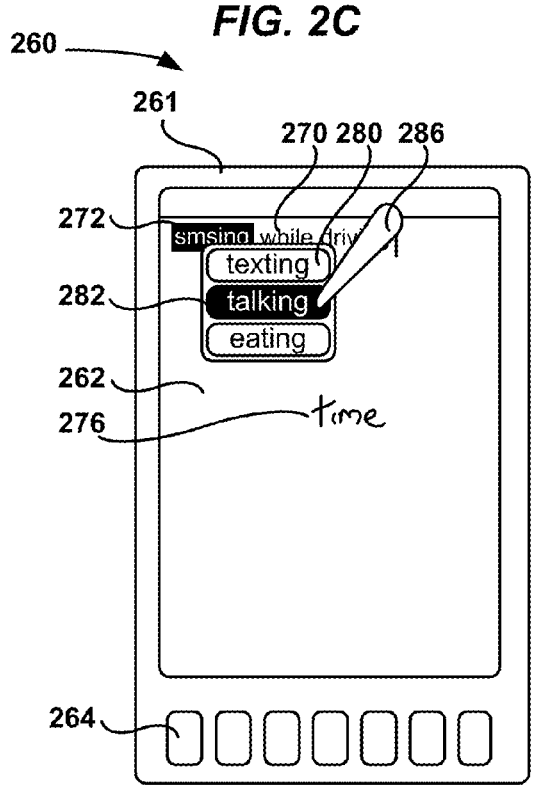

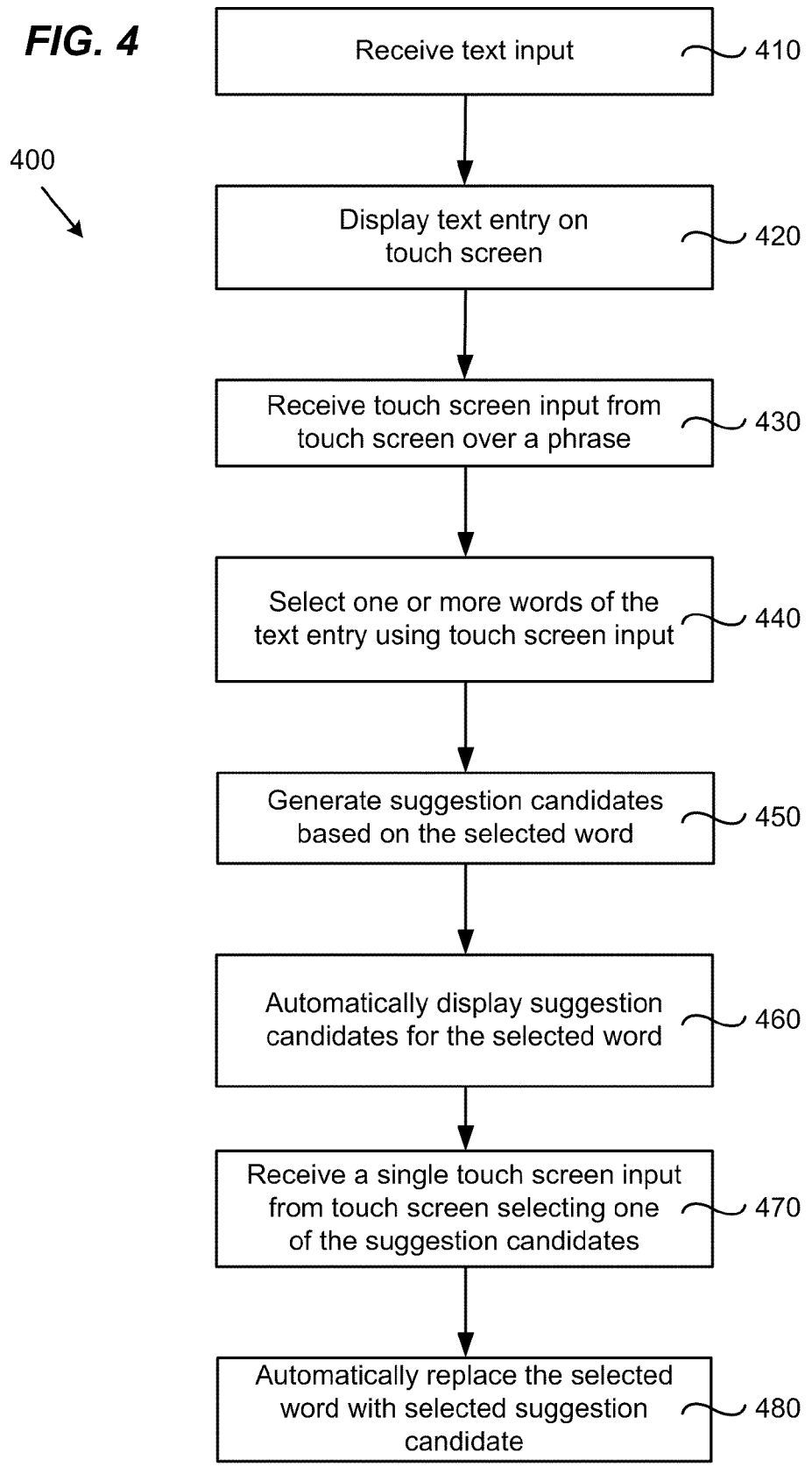

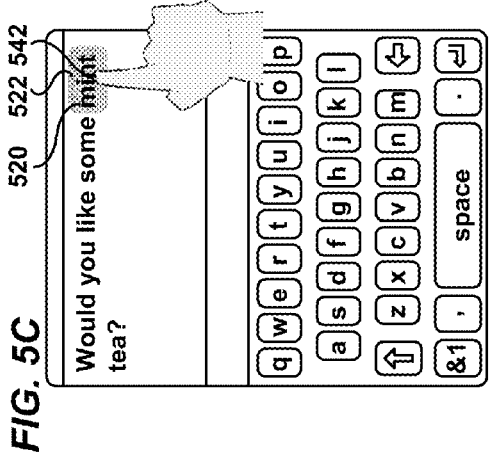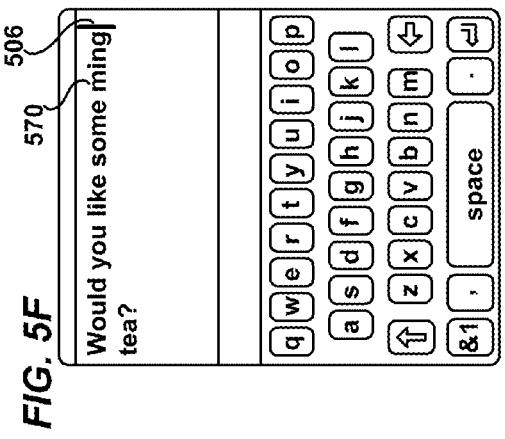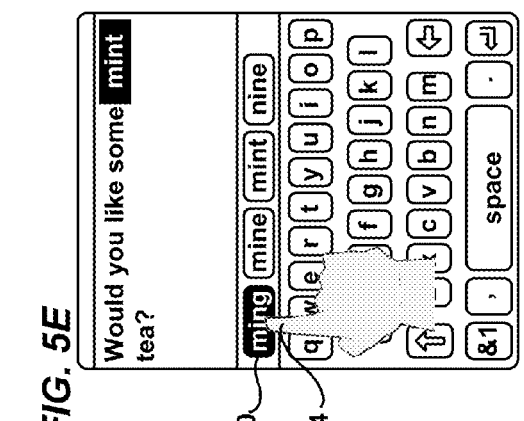

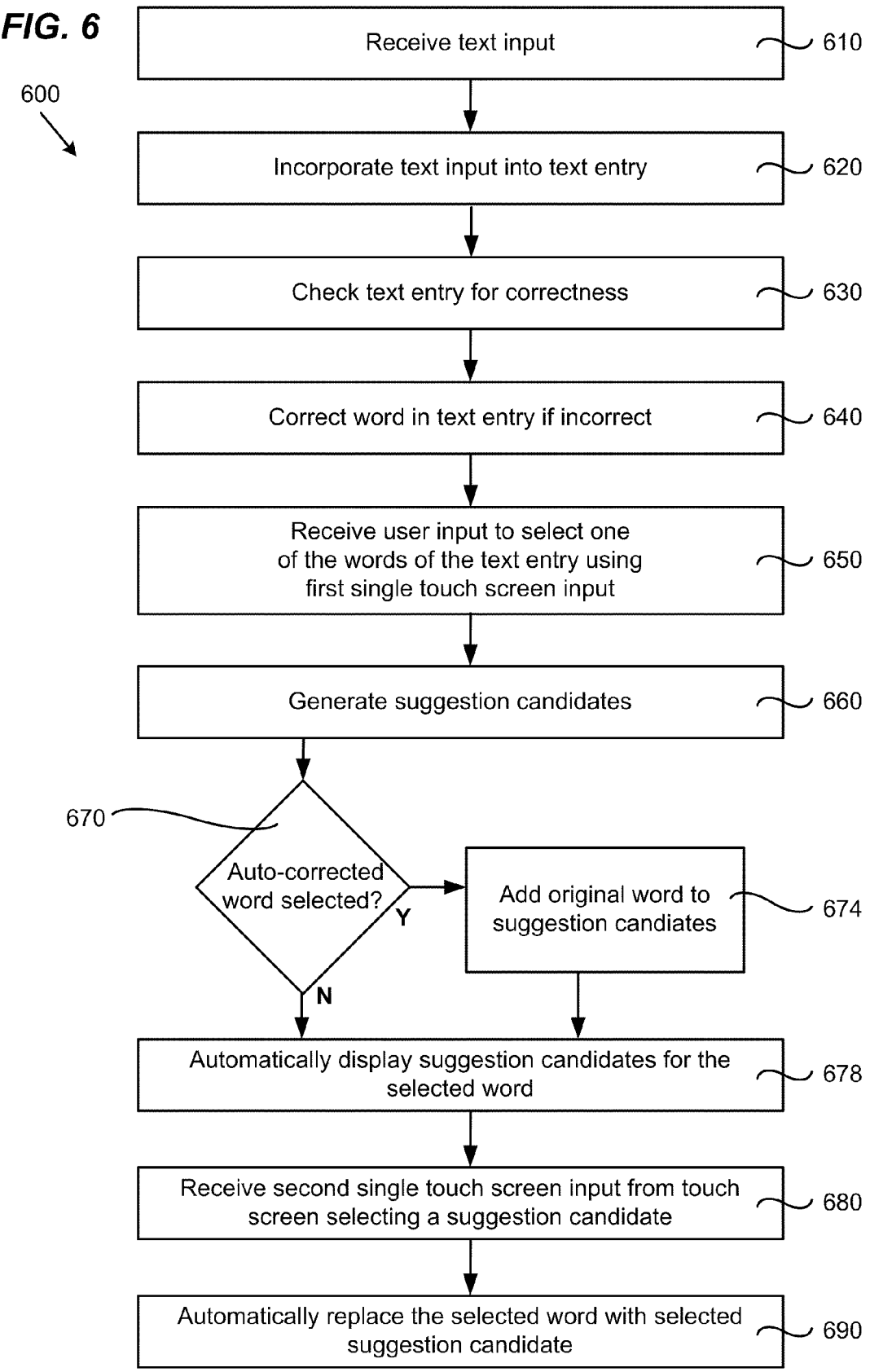

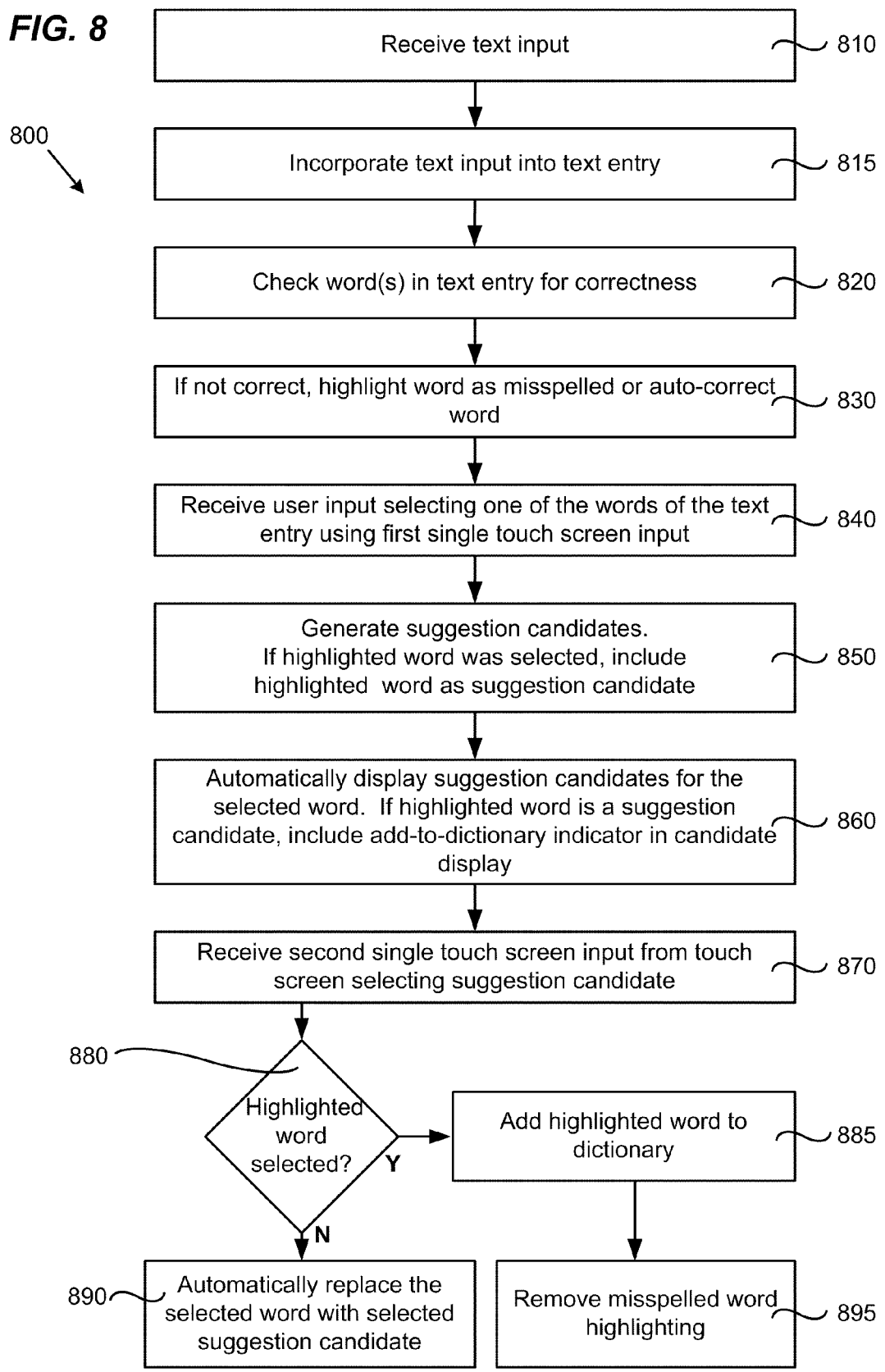

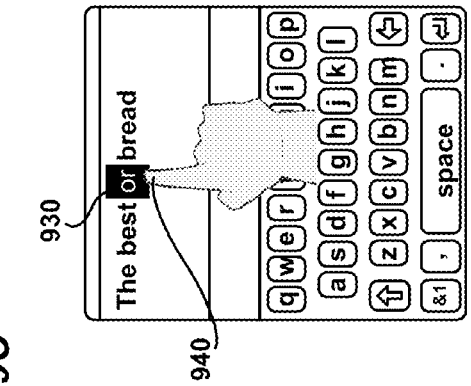
FIG. 9A
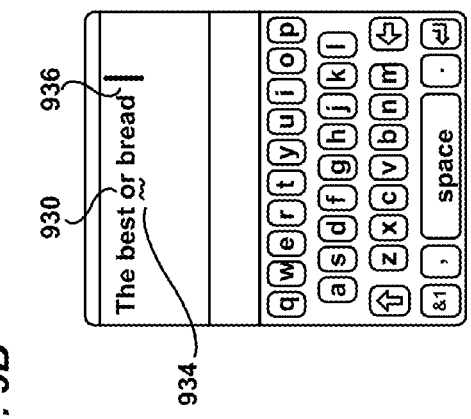
FIG. 9B
FIG. 9C
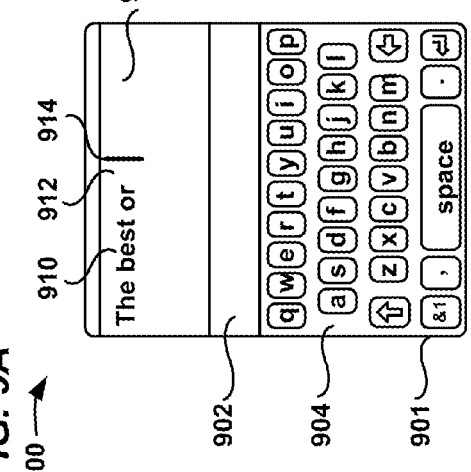
FIG. 9D
FIG. 9E
FIG. 9F
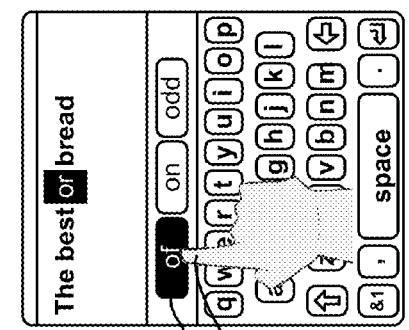
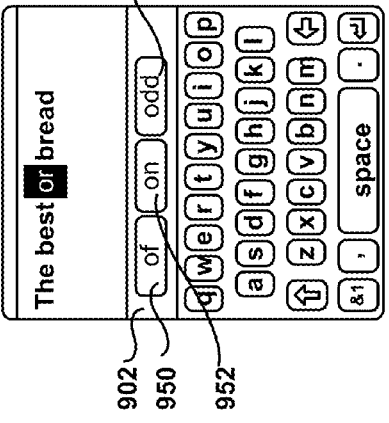

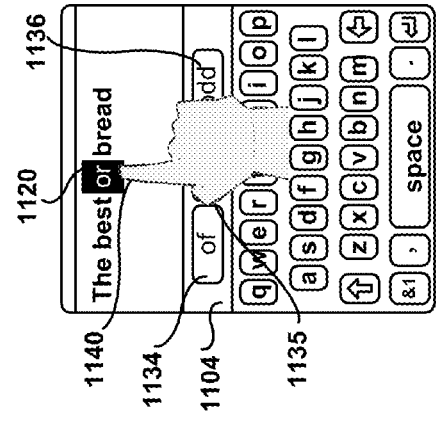
FIG. 11A
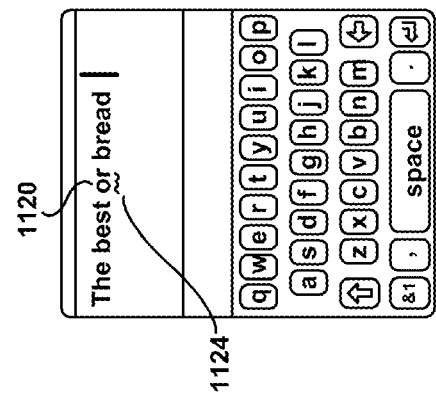
FIG. 11B
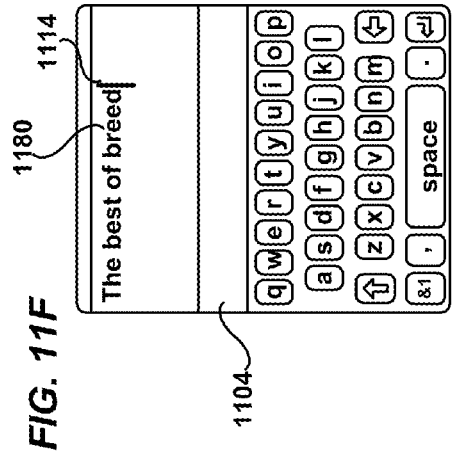
FIG. 11C
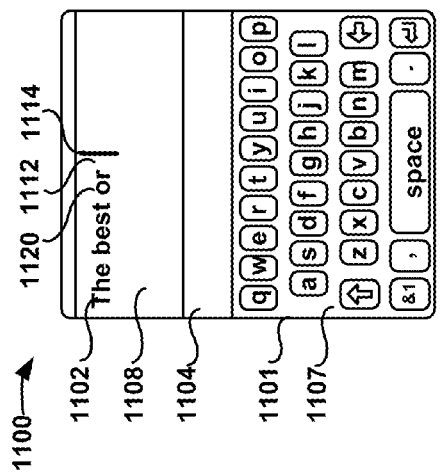
FIG. 11D
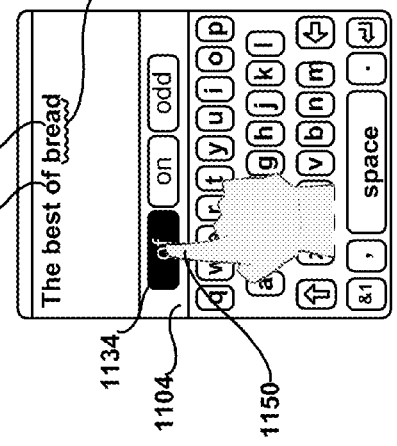
FIG. 11E
FIG. 11F

TYPING ASSISTANCE FOR EDITING

CROSS-REFERENCE TO RELATED APPLICATIONS

This application claims the benefit of U.S. Provisional Application No. 61/304,341, filed Feb. 12, 2010, and entitled "TYPING ASSISTANCE FOR EDITING," which is hereby incorporated herein by reference in its entirety.

FIELD

The present disclosure pertains to devices and methods for enhancing text entry using a touch screen device.

BACKGROUND

With the increasing popularity of mobile devices, including cellphone devices, handheld devices, handheld computers, smartphones, PDAs, etc., there is a need for improving the user interface experience by increasing user text input speed, reducing text entry errors, and improving the overall user experience.

Mobile devices with capacitive or resistive touch capabilities often utilize a touch screen keyboard, a hardware keyboard, speech recognition, handwriting recognition, or combination of the four, for entry of text input. Touch screen keyboards enable larger displays for videos, web pages, email, etc., without the requirement of a physical keyboard. Because touch screen keyboards are software-based, they can be easily adjusted for different languages, screen orientation, and key layouts. Furthermore, touch screen keyboards can be augmented with widgets for word prediction and disambiguation candidates.

Users of devices with touch screens, especially mobile devices, have varying abilities and styles of entering text. In particular, some users prefer to type large chunks of text input fairly rapidly, and do not stop to review and correct the entered text until complete phrases, sentences, or complete messages have been entered. Similarly, users entering text using speech recognition or handwriting recognition do not want to stop to review their text input until having entered completed phrases, sentences, or complete messages. Predictive typing assistance software, such as T9, only offers word prediction candidates as users type. After users finish typing, they are usually left without any assistance, and must then struggle to edit text by placing cursors in-between characters in order to proof and correct text.

Therefore, there exists ample opportunity for improvement in technologies related to facilitating user input on electronic devices by providing more helpful and accurate assistance in the text correction process in order to accelerate user text entry and reduce user input error rates.

SUMMARY

An apparatus and method are disclosed for providing feedback and guidance to touch screen device users to improve the text entry user experience and performance.

One exemplary embodiment disclosed herein is a method comprising receiving, with a text entry device, text input including a phrase, the phrase comprising one or more words, wherein at least a portion of the text input is displayed on a touch screen, receiving first touch screen input from the touch screen, based on the first touch screen input, selecting at least one of the words and automatically displaying one or more suggestion candidates related to the at least one selected word, receiving a second single touch screen input from the touch screen, based on the second single touch screen input, selecting one of the suggestion candidates, and modifying the text input by automatically replacing the at least one selected word with one or more words associated with the selected suggestion candidate.

In some examples, the method further comprises designated one or more of the words as incorrect and highlighting the incorrect words, where the at least one selected word is one of the highlighted incorrect words. In some examples the method further comprises designating one or more of the words as incorrect, where the one or more suggestion candidates includes at least one of the incorrect words, the automatically displaying the one or more suggestion candidates includes an add-to-dictionary indicator adjacent at least one of the incorrect words, and the modifying the text input further comprises adding a word associated with the selected suggestion candidate to a candidate source. In some examples, the method further comprises, in response to the modifying the text input, checking the modified text input for correctness, where the checking comprises determining that a second word of the modified text input is incorrect and highlighting the second word. In some examples, the method further comprises in response to the modifying the text input, checking the modified text input for correctness, and based on the checking, automatically replacing a word of the modified text input with another word. In some examples the first touch screen input is a single touch screen input. In some examples, the text input is received using a touch screen keyboard, a hardware keyboard, a speech recognition module, or a handwriting recognition module. In some examples the suggestion candidates are displayed adjacent to a keyboard, while in other examples the candidates are displayed adjacent to the selected word.

Another exemplary embodiment disclosed herein is a system comprising one or more processing units operable to execute computer-executable instructions for text entry and correction, one or more memory units coupled to the processing units, one or more touch screens having a display area, the one or more touch screens operable to receive touch input over at least a portion of the display area, and storage for storing the computer-executable instructions for text entry and correction. The storage includes computer-executable instructions for a text input module for receiving text input, a text entry module for associating the text input with a text entry, where at least a portion of the text entry is displayed using the display area of the one or more touch screens. The storage also includes computer-executable instructions for a touch screen input module for processing first touch screen input received from the touch screens to produce at least one selected word of the text entry, where the at least one selected word is identified using the first touch screen input, and second touch screen input received from the touch screens to select one of one or more suggestion candidates, where the second touch screen input is a single touch screen input on the touch screen area. The storage also includes computer-executable instructions for a candidate generation module for producing the suggestion candidates for the at least one selected word, where the candidate generation module causes the suggestion candidates to be automatically displayed after the at least one selected word is identified, and a correction module for automatically modifying the text entry by replacing the at least one selected word with a word associated with the selected suggestion candidate. In some examples, at least one of the suggestion candidates is automatically displayed with an add-to-dictionary candidate, the correction module is operable to add a word associated with the selected suggestion candidate to a candidate source.

A further exemplary embodiment disclosed herein is a computer-readable storage media storing computer-executable instructions that when executed cause a computer to perform a method comprising receiving text input using a touch screen, the text input including one or more words, wherein at least a portion of the text input is displayed on the touch screen as a text entry, receiving a first single touch screen input with the touch screen, the first single touch screen input being located over a complete word of the text entry, wherein the word is designated as complete after receiving a delimiter character in the text input, based on the first single touch screen input, indicating the complete word as a selected word on the touch screen, automatically displaying one or more suggestion candidates associated with the selected word on the touch screen, where the suggestion candidates are arranged on the touch screen according to a rank order, receiving a second single touch screen input from the touch screen immediately after the receiving the first single touch screen input, the second single touch screen input being located over a selected one of the one or more suggestion candidates, and based on the second single touch screen input, modifying the text entry by automatically replacing the selected word with a word associated with the selected suggestion candidate. In some examples, one or more of the suggestion candidates are received from a common speller application programming interface (CSAPI). In some examples, one or more of the suggestion candidates are received from a service provider in a computing cloud. In some examples, the method further comprises determining the rank order using one or more ranks received from one or more of the following: a system dictionary, a user dictionary, a common speller application programming interface, or an input history data source.

The described techniques and tools for solutions for improving text entry user experience and performance can be implemented separately, or in various combinations with each other. As will be described more fully below, the described techniques and tools can be implemented on hardware that includes software touch screen keyboards or hardware keyboards. As will be readily apparent to one of ordinary skill in the art, the disclosed technology can be implemented using various platforms coupled with a touch screen including, but not limited to, mobile devices (cellphones, smartphones, PDAs, handheld devices, handheld computers, PDAs, touch screen tablet devices), tablet or laptop computers, desktop computers, and home theater systems. As used herein, a touch screen includes a display coupled with touch sense capabilities (for example, displays using capacitive or resistive sensors).

The foregoing and other objects, features, and advantages will become more apparent from the following detailed description, which proceeds with reference to the accompanying figures.

BRIEF DESCRIPTION OF THE DRAWINGS

FIG. 1 illustrates a generalized example of a touch screen device, including a touch screen keyboard, suggestion candidates area, and text entry areas.

FIG. 2A illustrates a generalized example of a text entry device comprising a touch screen as a touch is made in a window, which includes a touch screen keyboard, candidates area, and text entry area. FIG. 2B illustrates a generalized example a mobile device, including a hardware keyboard, a candidates area, and a text entry area. FIG. 2C illustrates a generalized example of a tablet device, including a touch screen, a candidates area, and a stylus.

FIG. 4 is a flow chart that outlines an exemplary implementation of the method shown in FIGS. 3A-3D.

FIGS. 5A-5F depict a method of auto-correction using suggestion candidates comprising selecting a previously correct word as a suggestion candidate using a mobile device with a touch screen.

FIG. 6 is a flow chart that outlines an exemplary implementation of the method shown in FIGS. 5A-5F.

FIG. 8 is a flow chart that outlines an exemplary implementation of the method shown in FIGS. 7A-7D.

FIGS. 9A-9F depict a method of context-based auto-correction comprising selecting a first word highlighted as being incorrect and then automatically re-checking the text entry using a mobile device with a touch screen.

FIGS. 11A-11F depict a method of context-based auto-correction comprising selecting a first word highlighted as being incorrect, receiving input selecting a candidate to replace the word, automatically re-checking the text entry, and automatically highlighting another incorrect word using a mobile device with a touch screen.

DETAILED DESCRIPTION

I. General Considerations

Figure 3B:
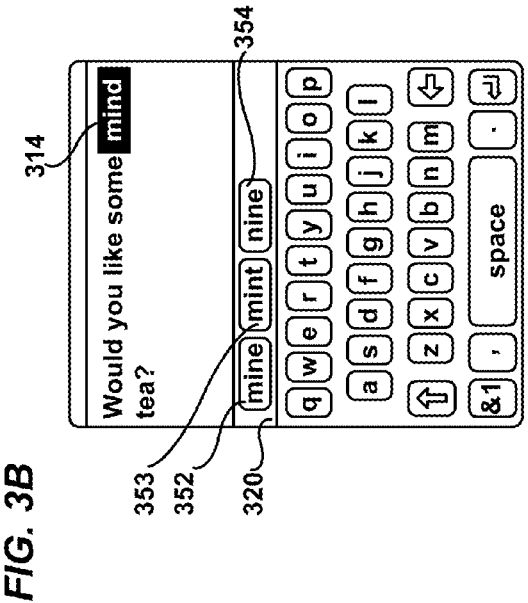
FIGS. 3A-3D depict a method of selecting suggestion candidates on demand using a mobile device with a touch screen.

This disclosure is set forth in the context of representative embodiments that are not intended to be limiting in any way.

As used in this application and in the claims, the singular forms "a," "an," and "the" include the plural forms unless the context clearly dictates otherwise. Additionally, the term "includes" means "comprises." Further, the term "coupled" encompasses mechanical, electrical, as well as other practical ways of coupling or linking items together, and does not exclude the presence of intermediate elements between the coupled items.

The described things and methods described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "select," "highlight," and "provide" to describe the disclosed methods. These terms are high-level abstractions of the actual operations that are performed. The actual operations that correspond to these terms can vary depending on the particular implementation and are readily discernible by one of ordinary skill in the art.

Theories of operation, scientific principles or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

In the following description, certain terms may be used such as "up," "down," "upper," "lower," "horizontal," "vertical," "left," "right," "over," "on," "near," and the like. These terms are used, where applicable, to provide some clarity of description when dealing with relative relationships. But, these terms are not intended to imply absolute relationships, positions, and/or orientations.

As used in this disclosure, the term "wait" may be used to describe the action a device takes while waiting for particular value or type of input before proceeding with a particular operation. This waiting should not be construed as limiting the device to only waiting for the particular type of input, rather, the device may receive other input or perform other actions concurrently with the waiting.

As used in this disclosure, the term "automatically" is used to describe actions that can proceed immediately, without receiving further user input. As used in this disclosure, the term "immediately" means that an action occurs within a short time period following a preceding action without needing to receive intervening user input. In some cases, there may be intervening actions performed between or concurrently with the preceding action and the action occurring "immediately," for example, screen refresh or redraw, sound playback, etc.

As used in this disclosure, the term "incorrect" is used to describe a designation of a word or phrase as being incorrect. A word designated as incorrect can be automatically highlighted or auto-corrected, even though the word designated as incorrect by a correction module might actually be considered to be correct by the user. For example, a word can be designated as incorrect because it does not exist in a dictionary, CSAPI (common speller application programming interface), or IHDS (input history data source). Alternatively, a word can be designated as "incorrect" even though it exists in a dictionary, CSAPI, or IHDS, because of other checking rules implemented in a correction module or candidate generation module, or because of the context of the word within a phrase.

As used in this disclosure, the term "over" is used to describe the positioning of one or more objects (for example, a finger, thumb, or stylus) over, on, or near a location on a touch screen. In some embodiments, this object need not come into contact with the touch screen for the object's position to be determined. In other embodiments, the object described as "over" the touch screen may be in contact with the surface of the touch screen. In some embodiments, the object determined to be "over" a location of the touch screen may not actually be positioned directly over the touch screen location, but determined to be "over" the location on the touch screen, for example, by a position correction module of the text entry device or touch screen.

The disclosed technology includes various approaches to improving typing accuracy or typing speed when using devices having a touch screen by using suggestion candidates to augment other input devices. These suggestion candidates are typically represented in a candidates area, which need not be permanently reserved for that purpose, or can appear in varying location on the touch screen. After entering one or more words to form a text entry, the user can review the text entry by viewing the touch screen and deciding whether to select word(s) for "suggestions." Although some examples disclosed herein describe "a word" or "a selected word," it should be understood that in some examples, selecting a word can include but is not limited to selecting a single word of a phrase with a single touch screen input, selecting multiple words of a phrase with a single touch screen input, or selecting multiple words of a phrase using touch screen input comprising plural single touch screen inputs. For example, auto-correction or unexpected-key feedback can be generated for a single word, or for a phrase comprising multiple words and spaces, but are related in some way.

In some examples, after input selecting a word is received, one or more suggestion candidates are displayed on the touch screen display. The suggestion candidates can be presented as "buttons" which include a word related to the word selected by the user. Suggestion candidates can be determined to be related to the selected word using a candidate generation module, which can use a dictionary, a thesaurus, a common speller application programming interface (CSAPI), an input history data source (IHDS), or other sources or methods to generate suggestion candidates. The candidate generation module can also determine the rank order in which suggestion candidates are presented. For example, the suggestion candidates can be presented from left to right, with the suggestion candidate determined to be the most likely presented farthest to the left, and the least likely suggestion candidate presented farthest to the right. The user reviews the suggestion candidates, and selects one of the candidates for replacement using a single touch screen input over the desired suggestion candidate on the touch screen.

As used in this disclosure, a single touch screen input refers to the input received when a user positions an object over the surface of a touch screen such that the touch screen device can determine the position of the object. In some embodiments, the object can be the user's finger or thumb. In other embodiments, the object can be a stylus or puck. In some embodiments, the single touch screen input is received after the user "taps" the touch screen over a word or suggestion candidates. In other embodiments, the single touch screen input is received when the user presses the screen with a finger, thumb, or stylus. Receiving a single touch screen input is sufficient to determine which suggestion candidate the user is indicating on the touch screen—no additional keyboard input, mouse input, trackball input, voice input, or additional touches are necessary. Using a single touch screen input to determine user selections simplifies the input process and allows for the fast correction of text entries without the need to use submenus, popup menus, or additional input devices.

II. Example Touch Screen Text Entry Device

FIG. 1 depicts an exemplary embodiment 100 of a text entry device 101 having a touch screen 102. The touch screen 102 includes a display area for a touch screen keyboard 120, a suggestion candidates area 150, and a text display area 103. The touch screen 102 includes text entry area 103, which has a "To:" text entry field 104 and a "Body:" text entry field 105. The Body: text entry field 105 is shown displaying a phrase "Would you like some mind tea?" 110. In some embodiments, only a portion of the text input is displayed because of, for example, screen size limitations. The word "mind" in the phrase 110 is highlighted, indicating that "mind" is the selected word 112. A carat (cursor) 114 is also shown in the Body: text entry field 105. In some embodiments, the carat 114 can be placed at various positions in the text entry area using a single touch screen input. In some embodiments, the touch screen 102 has a substantially planar surface, and the display capability can be implemented using LED, LCD, electronic ink, DLP, Plasma, CRT, or other suitable display technology.

The text entry device 101 has a touch screen 102 that displays a touch screen keyboard 120 having several keys 124, 126, 128, 130, 132, 134, etc. Some of the keys, including the backspace key 130, return key 132, and space key 134 are also designated as delimiter keys. As shown, the touch screen keyboard displays the keys 124, 126, 128, 130, 132, 134, etc. as images on the touch screen 102. The touch screen can include capacitive, resistive, inductive, or other suitable technologies for determining the position of one or more touch inputs detected over the surface of the keyboard and converting this touch input into text input. In some embodiments, the touch input is created using a stylus or puck, while in other embodiments the touch input can be created using a finger or thumb. In other embodiments, the touch screen keyboard 120 can be implemented as a hardware keyboard including mechanical keys.

The touch screen 102 also includes a suggestion candidates area 150, and is depicted in FIG. 1 showing three suggestion candidates "mine" 154, "mint" 156, and "nine" 158. As shown, the suggestion candidates area 150 includes widgets directly above the keyboard area containing word prediction and disambiguation candidates. Placing the suggestion candidates area 150 close to the touch screen keyboard 120 can improve typing speed and reduce errors by allowing users to maintain their focus of attention near the keyboard area while correcting a phrase 110 in the text entry area 103. In other embodiments, the suggestion candidates area 150 can be placed nearby the phrase 110 or selected word 112 in the text entry area 103.

The location of the text entry area 103, the keyboard 120, etc., can be varied based on the particular implementation and design.

FIGS. 2A-2C illustrate additional exemplary implementations 200, 230, and 260 of the disclosed technology. FIG. 2A depicts an exemplary implementation 200 of a text entry device, which includes a touch screen device 204 having a touch screen 206 displaying a window 208, including a designated text entry area 210 displaying the phrase "smsing while driving" 212, a suggestion candidates area 220, and a touch keyboard 224. A finger 222 is shown selecting the candidate "eating" in the candidates area 220.

FIG. 2B depicts an exemplary implementation 230 of a text entry device, which includes mobile device 231 having a touch screen 232 with a text entry area 234 (displaying the phrase "smsing while driving" 236), a suggestion candidates area 242, and a hardware keyboard 240.

FIG. 2C depicts an exemplary implementation 260 of a text entry device, which is a tablet PC device 261 having a touch screen 262 and input keys 264. The touch screen 262 is shown displaying the phrase "smsing while driving" 270 and displaying the word 272 "smsing" as highlighted. Also shown is a suggestion candidates area 280 indicating that a candidate "talking" 282 has been selected. As shown, the user can use an input stylus 286 to create touch input that is received by the tablet PC device 261. Also shown is a handwritten entry 276 of the word "time." The tablet PC device 261 can perform handwriting recognition on the handwritten entry 276 to convert the handwritten entry to text input. In some examples, the text entry device is not limited to receiving text input using a touch screen keyboard, but can also use hardware keyboards, handwriting recognition, or speech recognition to receive text input. In some examples, a tablet device can include a hardware keyboard.

Methods and apparatus for performing handwriting recognition can include but are not limited to those based on: Bayesian networks, neural nets, hidden Markov models, or k-nearest-neighbor approaches. Methods and apparatus for performing speech recognition can include but are not limited to those based on a dynamic time warping approach or hidden Markov models.

III. Example Candidates on Demand

Figure 19:
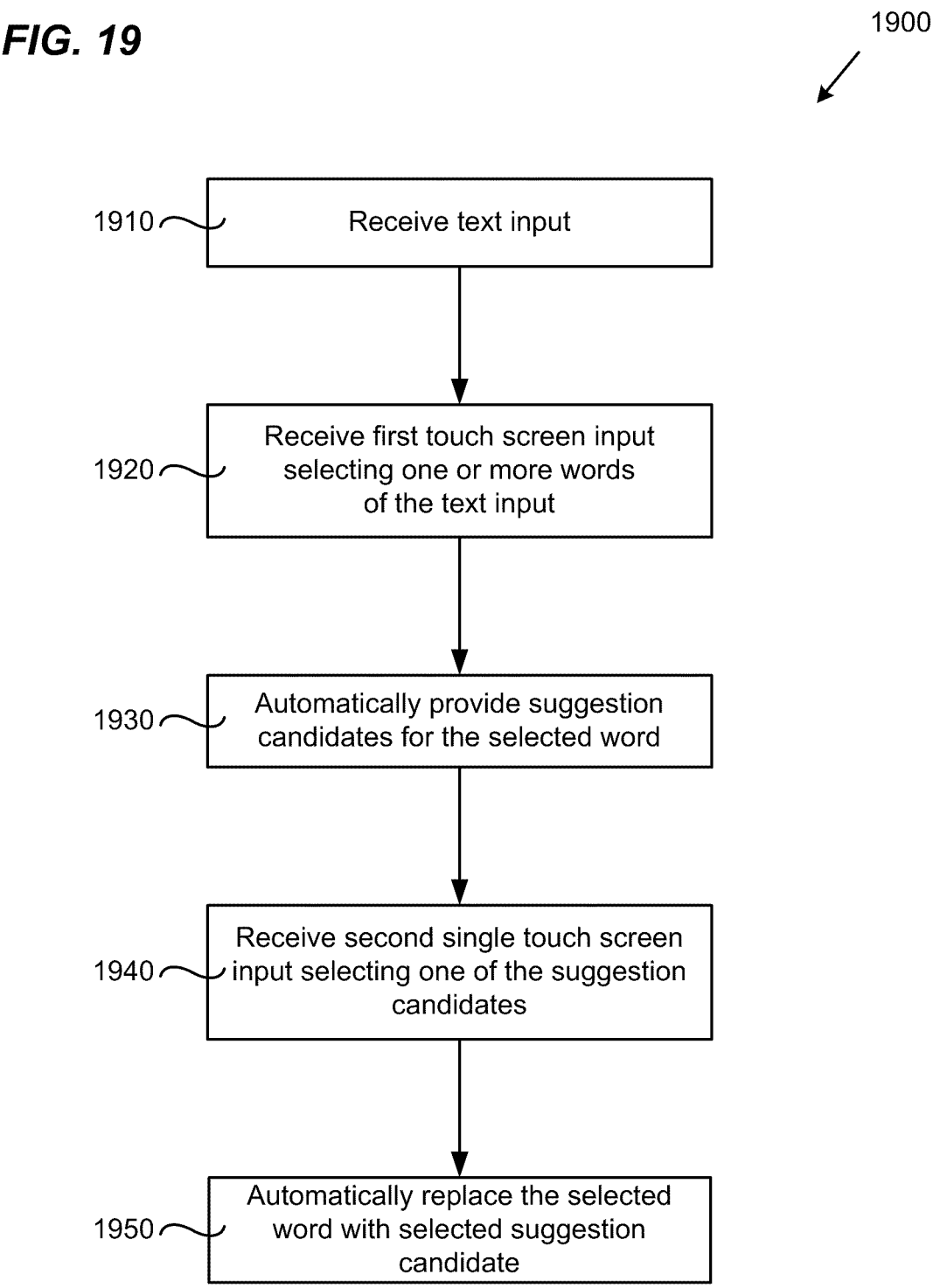
FIG. 19 is a flow chart that outlines an exemplary implementation of a method for providing suggestion candidates and replacing a selected word of text input with a word associated with a selected one of the suggestion candidates.

FIG. 19 is a flow chart 1900 that outlines a generalized method of receiving text input data, receiving a first touch screen input selecting one or more words of the text input data, automatically displaying suggestion candidates for the text input data, receiving a second single touch screen input selecting one of the suggestion candidates, and automatically replacing the selected word with the selected suggestion candidate by modifying the input data with one or more words associated with the selected suggestion candidate.

At process block 1910, text input data comprising one or more input word(s) is received from a source such as a touch screen keyboard. In some embodiments, the text input data includes text characters, text words, position data for key presses on a touch screen keyboard, typing speed data, correction data, and/or touch screen orientation data.

At process block 1920, touch screen input selecting one or more words of the text input data is received. In some examples, one or more words of the text input data have been previously highlighted to indicate to a user that the word may be incorrect or otherwise has suggestion candidates available. In some examples, a word is not highlighted, but a single touch screen input is received for a word in order to prompt the display of suggestion candidates. For example, responsive to receiving a first touch screen input, homonyms, synonyms from a thesaurus, or similarly spelled words can be generated for a selected word and displayed as suggestion candidates.

At process block 1930, one or more suggestion candidates are automatically provided to a user (e.g., using a touch screen display). Each of the suggestion candidates can be associated with an alternative word for one or more of the input words. In some examples, the suggestion candidates are associated with alternative words for only one of the input words, while in other examples, suggestion candidates are associated with alternative words for more than one of the input words. An exemplary display of a suggestion candidate includes displaying a button using a touch screen display, where the button includes the text of an associated alternative word within the boundary of the button.

At process block 1940, a second single touch screen input selecting one of the suggestion candidates is received. For example, the selection can be received using a single touch screen input created by a user pressing a finger over a button associated with the desired touch screen candidate on a touch screen display.

At process block 1950, the input data is modified automatically using the alternative word associated with the selected suggestion candidate. In some examples, the alternative word is used to replace the input word in the input data. In other examples, the alternative word is added to the input data preceding or subsequent to the input word. In some examples, the "alternative" word is a word that was previously autocorrected, and the alternative word is therefore used to effectively undo a word inserted in the input data using an autocorrection routine. Thus, as described above, a quick and effective way of providing suggestion candidates and indicators of their availability is provided that allows users to quickly modify input data using the suggestion candidates.

IV. Example Candidates on Demand

FIGS. 3A-3D depict a method 300 for receiving a single touch screen input requesting replacement candidates for a word, and replacing the word with a selected suggestion candidate.

Figure 3D:
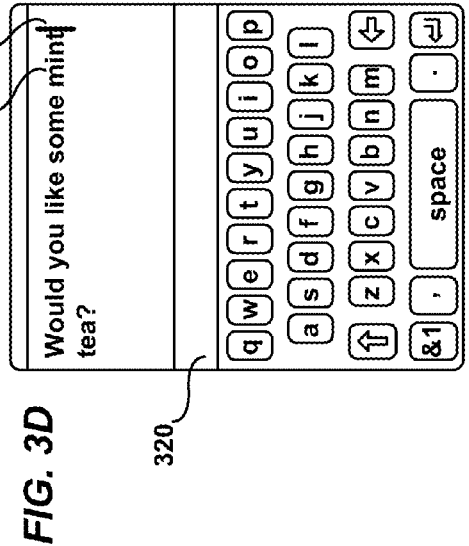
Figure 3A:
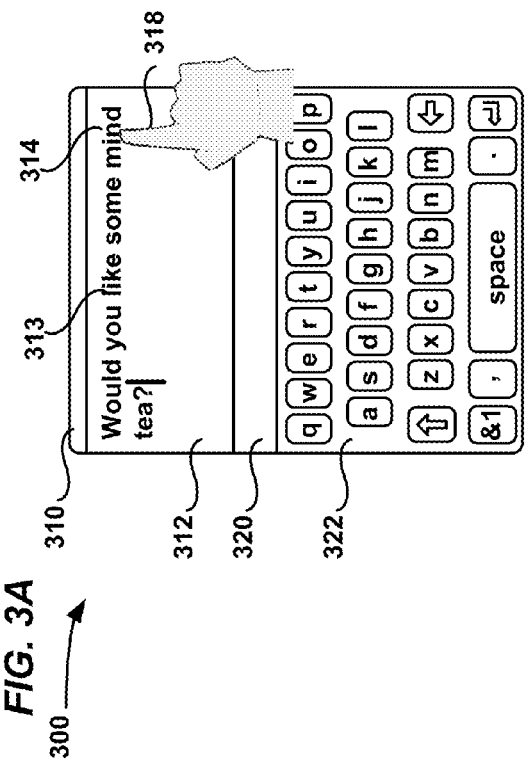

FIG. 3A depicts a mobile device 310 having a touch screen 312, suggestion candidates area 320, and a keyboard 322. Using the keyboard 322, a user has typed the phrase "Would you like some mind tea?" 313. The user reviews the phrase 313 and determines that one of the words, "mind" 314, is incorrect. The user makes a single touch input using a finger 318 on the surface of the touch screen 312 over the location of the word "mind."

FIG. 3B depicts the display of the mobile device 310 immediately after receiving the single touch screen input. As shown in FIG. 3B, the word "mind" 314 is now highlighted to indicate that the word was selected by the single touch screen input. In response to this selection, candidates for replacing the selected word are automatically generated. Specifically, the candidates area 320 has also been updated to display three suggestion candidates: the words "mine" 352, "mint" 353, and "nine" 354.

Figure 3C:
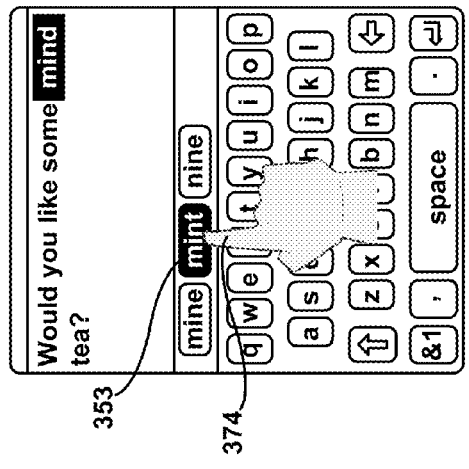

Turning to FIG. 3C, the user examines the suggested candidates and selects the candidate "mint" 353. The user makes a second single touch screen input by pressing the touch screen over the suggestion candidate "mint" 353 with a finger 374. The background of the selected suggestion candidate 353 is highlighted to indicate that the candidate has been selected. In some embodiments, a sound is also played over a speaker to indicate that a suggestion candidate 353 has been selected. In some embodiments, an animation may be displayed instead of, or in addition to, highlighting the selected candidate.

Finally, turning to FIG. 3D, the mobile device 310 automatically replaces the word "mind" 314 with the word "mint" 380 previously selected using the suggestion candidate 353. In addition, the candidates area 320 has been automatically cleared, and the carat (cursor) 384 is placed at the end of the replaced word 380.

FIG. 4 is a flow chart 400 further detailing the method 300 of performing a candidates-on-demand replacement shown in FIGS. 3A-3D. At process block 410, text input is received from a source such as a touch screen keyboard, a hardware keyboard, a handwriting recognition module, or a speech recognition module. At process block 420, the received text input is displayed as a text entry on a touch screen. At process block 430, touch screen input is received from the touch screen over one or more words of the phrase. In some embodiments, the user can select a word of the phrase using a single touch screen input located over the word. In other embodiments, the user can select two or more words of the phrase by providing a first touch screen input at a starting point of the selection, and a second touch screen input at the end point of the selection. For example, a user can select the two words "of the" in the phrase "the best of the rest" by make a first touch screen input over the word "of" and a second touch screen input over the word "the." In other embodiments, the user can select one or more words of the phrase using a single touch screen input, in which case the text input device can determine that two words are to be selected based on, for example, determining that the single touch screen input was located between two words and selecting those two words. Alternatively, a correction module or a candidate suggestion module can use the context of the phrase to determine which word or words are to be selected.

At process block 440, which can occur immediately after process block 430, and with no other user input, a word of the text entry is selected based on the input data from the first single touch screen input received at process block 430. For example, the first single touch screen input is detected as being positioned over the word that is then selected. In some embodiments, inputs near but not directly over a word can be interpreted as being over a nearby word. After receiving the first single touch screen input, suggestion candidates are generated based on the word selected by the first single touch screen input at process block 450. In some embodiments, suggestion candidates are selected based not only on the selected word, but based on the context in which the selected word is used in a phrase. In some embodiments, words that are before or after a selected word can be used to determine which suggestion candidates are generated, or to determine the rank order in which suggestion candidates are presented. For example, if a prior word is "Happy" and a following word is "Year," the word "New" might receive a higher priority in the rank order in which suggestion candidates are presented. At process block 460, one or more suggestion candidates for the selected word are automatically displayed. The display occurs "automatically" in that process blocks 450 and 460 can take place in response to receiving the first single touch screen input, and no other user input is necessary before displaying the suggestion candidates.

At process block 470, the method waits until a second single touch screen input is received from the touch screen indicating one of the suggestion candidates as the selected suggestion candidate. Finally, at process block 480 the word selected at process block 440 is automatically replaced with a word associated with the suggestion candidate selected at process block 470.

V. Example Autocorrection Undo with Candidates

FIGS. 5A-5F illustrate another embodiment of the disclosed technology comprising a method 500 of selecting replacement candidates for a word that has been auto-corrected. At FIG. 5A, a text entry device 502 is shown on which a user is entering the phrase "Would you like some ming" 504. The carat 506 indicates the current position of the user text entry. At FIG. 5B, the user has completed the phrase, which now reads "Would you like some mint tea?" and the carat 506 is displayed at the end of the phrase 504. As shown, the text entry device has automatically performed a spelling auto-correction routine and automatically replaced the word "ming" with the word "mint" 520. In addition to replacing the word "ming", the device as also added highlighting 522 to indicate to the user that the word has been auto-corrected.

As shown in FIG. 5C, the user next reviews the text entry and places a finger 542 over the word mint 520. In response to and immediately after receiving the touch input, suggestion candidates 560, 562, 564, and 568 are displayed as shown in FIG. 5D. As shown, the selected word, mint 520, has been automatically highlighted after receiving the user's touch input. In addition, the candidates area 554 now displays a list of four candidates 560, 562, 564, and 568. The first candidate, "ming" 560, is the original word that was autocorrected by the device. The other three candidates 562, 564, and 568 are generated by a candidate generation module.

As shown in FIG. 5E, the user reviews the suggestion candidates and using a finger 564 selects the first suggestion candidate "ming" 560, which was the original word before auto-correction. In some embodiments, after selecting the suggestion candidate 560, the word(s) can be highlighted to indicate to the user that the replaced word "ming" does not exist in the dictionary, and that receiving a third single touch screen input over either the highlighted word, or over the suggestion candidate, will add the word to the dictionary.

Finally, as shown in FIG. 5F, the text entry device replaces the autocorrected word with the original word "ming" 570, and places the carat 506 at the end of "ming.

FIG. 6 is a flow chart 600 further detailing the method 500 of performing auto-correction. At process block 610, text input is received from one or more input sources. At process block 620, this text input is incorporated into a text entry. At process block 630, one or more words of the text entry are checked for correctness using a correction module that includes a grammar checker, a spell checker, or the like.

In some embodiments, the correction module can produce suggestion candidates that take into account the types of errors that have a higher probability for a given input mode. In addition to errors that are corrected in the same fashion across different input modes, the correction module can produce different corrections based on the input mode used. That is, different corrections can be produced based on whether the text input is received using a touch screen keyboard, hardware keyboard, speech recognition, or handwriting recognition. For example, when using a keyboard, the text input "vave" could be corrected as "cave," since the probability of erroneously typing the letter "v" instead of "c" is high because the keys are adjacent on a standard QWERTY keyboard. When using handwriting recognition, the text input "vave" could be corrected as "wave," since the probability that the user intended the letter "w" is high based on the similarity of the shapes of the letters "v" and "w."

At process block 640, the text entry is modified by replacing a word designated as incorrect by the correction module with another word. In some embodiments, the word is not simply determined to be correct or incorrect, but can be determined to have discrete levels of correctness. For example, some embodiments can determine that a word is one of the following: correct, suspect (where auto-correction is suppressed and the word is only highlighted in the display), or incorrect (where the word is automatically auto-corrected). At process block 650, a single touch screen input is received over the replacement word, and the method automatically proceeds to process block 660, where suggestion candidates are generated. At process block 670, a determination is made whether the word that was selected was previously auto-corrected at process block 640. If so, the method proceeds to process block 674, and the original word, which was replaced at process block 640, is added to the generated list of suggestion candidates. In either case, the method next proceeds to process block 678, where the list of suggestion candidates is displayed to the user. At process block 680, a second single touch screen input is received over one of the suggestion candidates, and the method immediately proceeds to process block 690, where the selected word is automatically replaced with the selected suggestion candidate. In some embodiments, the replaced word is then highlighted to indicate that the word is not in the dictionary, and to indicate that the user can add the word to the dictionary by a making another single touch screen input over the highlighted word, over the suggestion candidate, or by pressing a designated key on the keyboard, such as the space key or the return key. In some embodiments, the highlighted word can be added to a user dictionary, and the word will not be auto-corrected for a period of time. For example, a user dictionary can be implemented using a FIFO buffer that holds up to 100 user-designated entries. Once more than 100 user entries are made to the user dictionary, the first word entered in the user dictionary is again flagged as incorrect.

As will be discussed further below, the suggestion candidates can be generated automatically by the text entry device using a system dictionary, a user dictionary, a CSAPI (common speller application programming interface) module, and/or an IHDS (input history data source) module. In some embodiments, the data for generating the suggestion candidates is stored locally in a computer-readable storage medium. In others, some or all of the data for suggestion candidates can be accessed using a wired or wireless network that connects to a remote correction module or candidate generation module. In some embodiments, the suggestion candidates can be generated based not just on a selected word, but also based on the context of the word in a phrase. For example, the position of a word at the beginning or end of a phrase, or the words before or after the selected words, can be used to determine which suggestion candidates are generated, or the rank order in which suggestion candidates are presented.

VI. Example Add Word to Auto-correction Rule Set

Figure 7A:
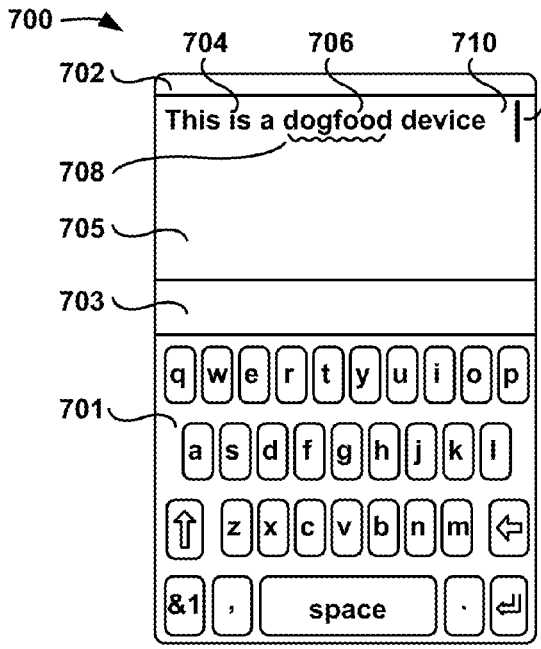
FIGS. 7A-7D depict a method of adding a word to a correction module rule set comprising selecting a word highlighted as being incorrect and adding the selected word to a dictionary using a mobile device with a touch screen.

FIGS. 7A-7D illustrate another embodiment of the disclosed technology including a method 700 of adding a highlighted word to a user dictionary. FIG. 7A shows a text entry device 702 having a touch screen 705, keyboard 701, and suggestion candidates area 703. The user has entered the phrase "This is a dogfood device" 704. The text entry device 702 is depicted immediately after the user has entered a space delimiter 710, and a carat 712 is also shown. A correction module has examined the phrase 704 and determined that the word "dogfood" 706 has been misspelled. In some embodiments, the word is not simply determined to be correct or incorrect, but can be determined to have discrete levels of correctness. For example, some embodiments may determine that a word is one of: correct, suspect (and thus highlighted in the display), or incorrect (and automatically auto-corrected). Thus, the word "dogfood" 706 is highlighted because a correction module determines "dogfood" to be suspect but not incorrect. The text entry device 702 indicates this determination by displaying a squiggle 708 underneath the misspelled word 706.

Figure 7B:
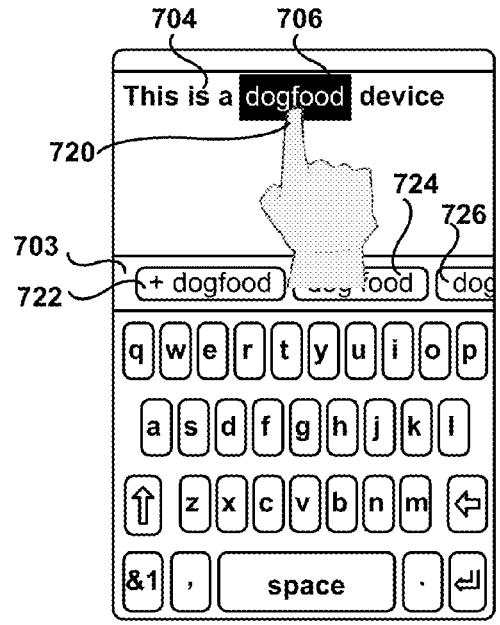

FIG. 7B depicts the text entry device 702 immediately after the user has reviewed the touch screen 705 and made a first single touch input using a finger 720 over the word "dogfood" 706. In response to and immediately after the first single touch input is received, the text entry device 702 highlights the word 706 and presents several suggestion candidates 722, 724, and 726 in the candidates area 703. In some embodiments, there are selected words or phrases for which no suggestion candidates are shown, or only the word "dogfood" 706 is displayed as a suggestion candidate 722. As shown, the word 706 indicated as misspelled is displayed as a suggestion candidate 722, along with an add-to-dictionary indicator. Here, the add-to-dictionary indicator is the plus sign ("+") displayed before the word "dogfood." Thus, a user that disagrees with the auto correction can add the word to the dictionary in order to avoid future indications that the word is misspelled. In some embodiments, the addition of a word to the dictionary can be used by a correction module for future suggestions, highlighting, or auto-correction. For example, after adding the word "dogfood" 706 to the dictionary, if a user later provides the text input "dpgfood," the text entry device 702 can auto-correct the word to be replaced with "dogfood."

Figure 7C:
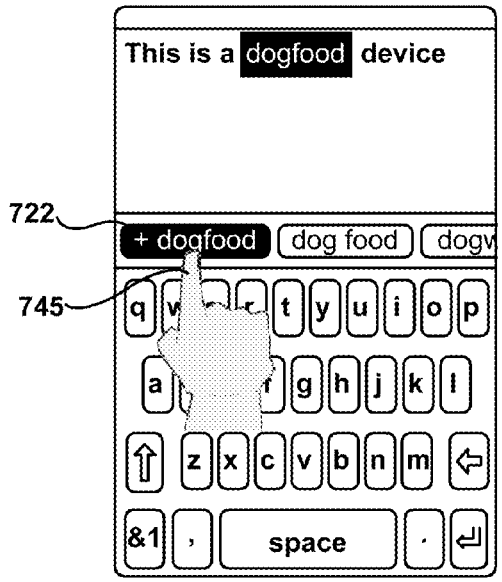
Figure 7D:
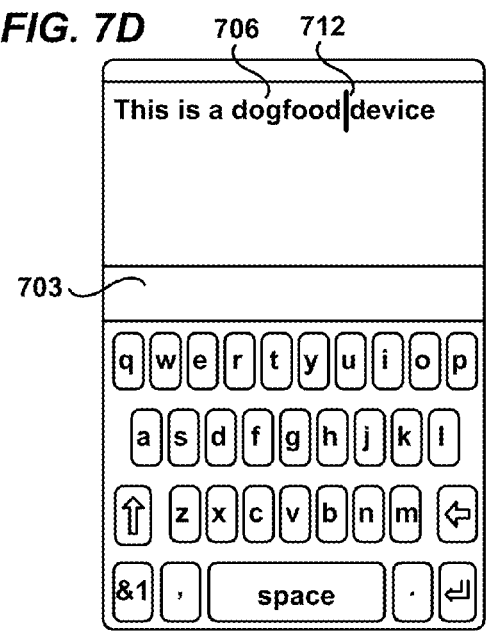

FIG. 7C depicts the user making a second single touch input with a finger 745 over the suggestion candidate 722. The mobile device 702 immediately highlights the suggestion candidate 722 to indicate that a suggestion candidate has been selected. Next, as shown in FIG. 7D, the squiggle 708 has been removed from underneath the word "dogfood" 706 and the carat 712 is displayed at the end of the word on the touch screen 705.

FIG. 8 is a flow chart 800 further detailing the method 700 of performing an add-to-dictionary operation. At process block 810, text input is received and the method continues to process block 815, where the text input is incorporated into a text entry. At process block 820, one or more words of the text entry are checked for correctness using a correction module that uses, for example, one or more of the following: a dictionary, a thesaurus, a CSAPI, or an IHDS. At process block 830, one or more of the words are designated as incorrect, so the word(s) are indicated as being incorrect using one or more of the following forms of highlighting: a "squiggle" line underneath the word, a change in color in the background of the word, using a sound or tone played over a speaker, or a change in font style to italics or bold. In some embodiments, the word is not simply determined to be correct or incorrect, but can be determined to have discrete levels of correctness. For example, some embodiments may determine that a word is one of: correct, suspect (and thus highlighted in the display), or incorrect (and automatically auto-corrected). At some point after highlighting the word(s) as misspelled, at process block 840 a single touch screen input is received over one of the words of the text entry, and the word is selected.

At process block 850, the device then generates suggestion candidates for the word, and also checks to see if the selected word was highlighted at process block 830. If a highlighted word was selected, the device also includes the highlighted word as a suggestion candidate. Next, at process block 860, the device automatically displays the generated suggestion candidates. If a highlighted word is included as one of the suggestion candidates, the device also includes an add-to-dictionary indicator, for example, a plus sign ("+"), icon, color, or other indicator that distinguishes the add-to-dictionary candidate from the other suggestion candidates.

Next, at process block 870, a second single touch screen input over one of the suggestion candidates is received. At process block 880 a determination is made whether a highlighted (add-to-dictionary) candidate was selected, and if so, the method proceeds to process blocks 885 and 895. At process block 885, the highlighted word is added to one or more dictionaries, which can be stored in a text entry device or remotely, in, for example, a computing cloud. Finally, at process block 895 t the highlighting indicating the word as being misspelled is removed. If an add-to-dictionary candidate was not selected, he selected word is automatically replaced with a word associated with the suggestion candidate at process block 890.

VII. Example Context-based Auto-correction

FIGS. 9A-9F illustrate another embodiment of the disclosed technology including a method 900 of auto-correcting additional words in a phrase after the user has selected a suggestion candidate. FIG. 9A depicts a text entry device 901 having a touch screen display 903, keyboard 904 and candidates area 902. The user has entered the incomplete text phrase "The best or" 910, which includes a space delimiter 912 as shown before the carat 914. FIG. 9B depicts the text entry device 901 after receiving further text input, such that the phrase is now "The best or bread." After receiving a space delimiter 936 after the word "bread," the text entry device 901 invokes a correction module to check the phrase and determines, based on the context of the phrase, that the word "or" 930 is incorrect as used in the phrase, and hence highlights the word "or" with a squiggle 934.

FIG. 9C depicts the user selecting the highlighted word "or" 930 with a finger 940. Next, as depicted in FIG. 9D, the candidates display area 902 has been updated to show three suggestion candidates 950, 952, and 954. At FIG. 9E, the user is shown selecting a suggestion candidate 950 "of" with a finger 960. FIG. 9F depicts the text entry device 901 immediately after the suggestion candidate 950 "of" has been selected. As shown, the word "or" is replaced with the word "of" 970. The text entry device 901 immediately performs auto-correction on the entire text phrase "The best or bread" by invoking the correction module and then replacing the word of the phrase, "bread," with "breed" 972. The carat 914 is placed at the end of the phrase after the auto-correction process block.

Figure 10:
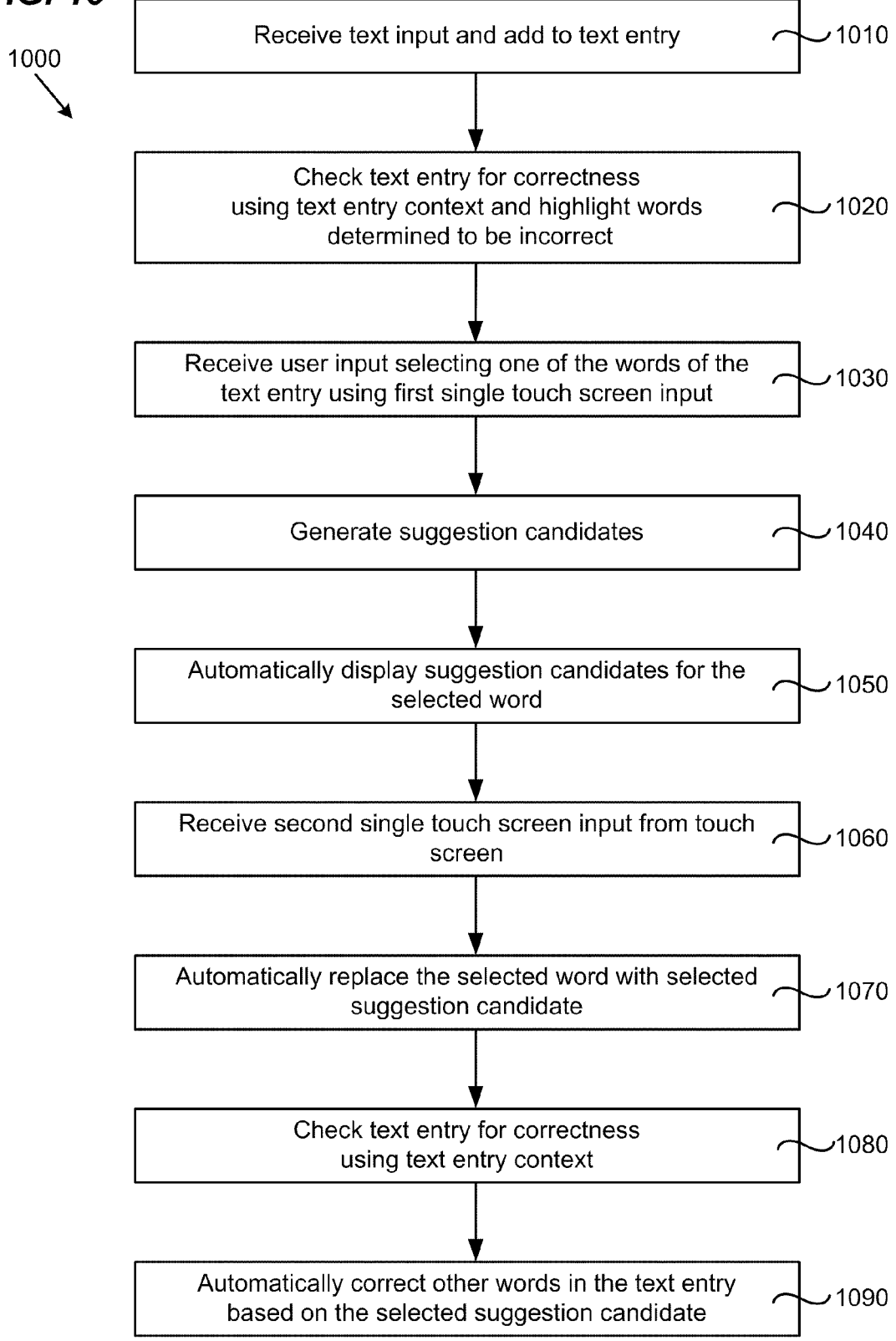
FIG. 10 is a flow chart that outlines an exemplary implementation of the method shown in FIGS. 9A-9F.

FIG. 10 is a flow chart further detailing the method 900 of context-based auto-correction sequence shown in FIGS. 9A-9F. At process block 1010, text input is received and added to a text entry, followed by process block 1020, where a correction module is invoked to check the text entry for correctness. This check includes checking words in the text entry in context such that words appearing before or after a word being checked can affect whether the word being checked is determined to be incorrect. For example, the word "or" may be designated as correct in the incomplete phrase "The best or" but designated as incorrect in the phrase "The best or breed." Words designated as incorrect can be highlighted using, for example, a different color background or an underline.

At process block 1030, a first single touch screen input is received and determined to be over a word of the text entry. The word is selected and also highlighted on the display to indicate that the word has been selected. Next, at process block 1040 a candidate generation module is invoked to produce suggestion candidates for the word based on the phrase context, dictionaries, a CSAPI, or an IHDS, etc. At process block 1050, these suggestion candidates are automatically displayed in a suggestion candidates area of the touch screen. The suggestion candidates are automatically displayed in that only the single touch screen input needs to be received before the suggestion candidates are presented on the display.

At process block 1060, the method waits until receiving a second single touch screen input determined to be over one of the suggestion candidates. At process block 1070, the selected word is automatically replaced with a word associated with the suggestion candidate selected using the second single touch screen input. Next, at process block 1080, a correction module is invoked to check the text entry for correctness using the context of the word in the text entry. Finally, at process block 1090, the additional words in the text entry are automatically corrected. These additional words may have been designated as correct previously, but are now designated as incorrect because of the replacement word that was added to the text entry at process block 1070.

VIII. Example Context-based Correction Suggestion

FIGS. 11A-11F illustrate another embodiment of the disclosed technology including a method 1100 of automatically generating correction suggestions for a text entry after the user has replaced another word in the text entry with a suggestion candidate. The correction suggestion need not be limited to checking the spelling of words, but can include grammar checking or other context-based analysis using a correction module.

As shown in FIG. 11A, the text entry device 1101 has received a text input as shown on the touch screen 1108 including the phrase "The best or" 1102, including the word "or" 1120, and a delimiter space 1112. A carat 1114 is displayed after the delimiter space 1112. Also shown is a candidates area 1104 and keyboard 1107. FIG. 11B depicts the text entry device 1101 after receiving further text input, such that the phrase is now "The best or bread." As shown, t the phrase 1102 has been spell checked and the word "or" 1120 is designated as incorrect, as indicated by the squiggle 1124.

FIG. 11C shows the text entry device 1101 immediately after a user has selected the word "or" 1120 with a finger 1140. As shown, the candidates area 1104 has automatically been updated to display three suggestion candidates: "of" 1134, "on" 1135, and "odd" 1136. At FIG. 11D, the user reviews the suggestion candidates and selects the selection candidate 1134 (which displays the word "of") in the candidates area 1104 using a finger 1150. The word "or" 1120 in the phrase is immediately replaced with the word "of" 1162 and the phrase is also automatically spell-checked again. Based on the new phrase "The best of bread" the text entry device 1101 invokes a correction module, which determines that the phrase "The best of bread" is incorrect. The text entry device highlights this by placing a squiggle line 1168 under the word "bread" 1164 on the touch screen 1108.

FIG. 11E depicts the text entry device 1101 immediately after the user selects the word "bread" 1164 with a finger 1170. As shown, the candidates area 1104 has been updated to display several suggestion candidates including the word "breed" 1172 and "breeze" 1174. Subsequently, the user selects the suggestion candidate "breed" 1172 with a single touch screen input (not shown). As shown in FIG. 11F, after receiving the single touch screen input, the device 1101 has automatically updated the phrase with the suggestion candidate selected by the user so that the phrase reads "the best of breed," moved the carat 1114 to the end of the replaced word "breed" 1180, and cleared the candidates area 1104.

Figure 12:
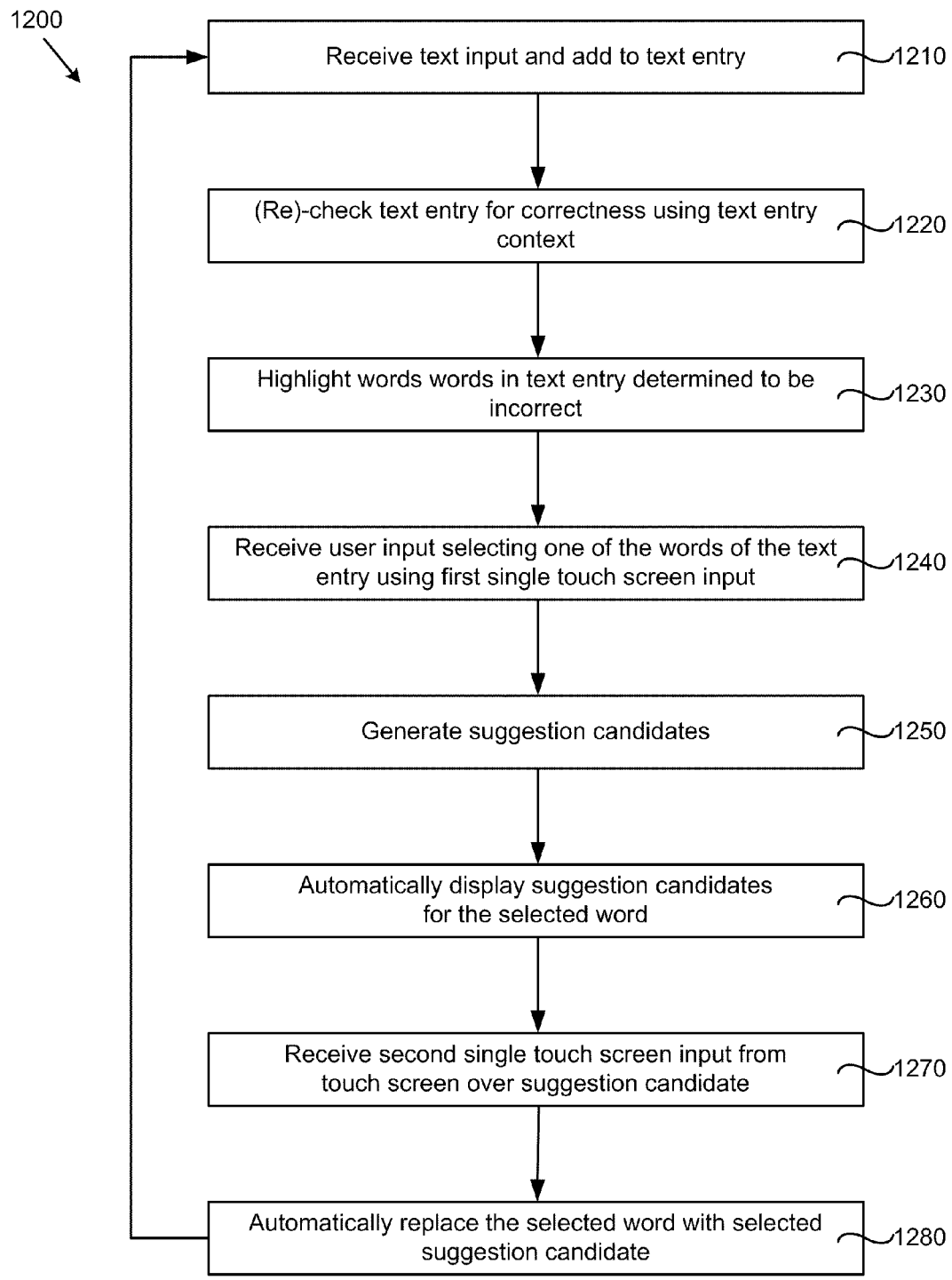
FIG. 12 is a flow chart that outlines an exemplary implementation of the method shown in FIGS. 11A-11F.

FIG. 12 is a flow chart 1200 further detailing the method 1100 of performing context-based correctness checking shown in FIGS. 11A-11F. At process block 1210, t text input is received and added to one or more text entry fields. At process block 1220, the text entry is checked by invoking a correction module. This checking can include spell checking or grammar checking, and the checking can also include context-based checking of the words using surrounding words in the text entry. Context-based checking can also include using different rules or dictionaries based on the type of text entry being editing. For example, if an email address entry field is being checked, the device can use the user's email address book to determine the correctness of names or email addresses. As another example, if the body of an email is being checked, the correction module can use only a system dictionary, only a system and user dictionary, or another combination of dictionaries or rules.

At process block 1230, any words or phrases designated as incorrect during the checking process block 1220 are displayed using highlighting. For example, the incorrect word can appear on the display with an underline, squiggle, or color highlighting.

As process block 1240, a single touch screen input is received from a touch screen. The single touch screen input is determined to have been received over one of the words highlighted as incorrect, and the method proceeds to process block 1250, where a list of suggestion candidates is generated. Next, at process block 1260, suggestion candidates for the selected words are automatically displayed in a candidates area.

At process block 1270, the method waits until a second touch screen input is received over one of the suggestion candidates. Process block 1280 occurs immediately after receiving this second single touch screen input, where he selected word is automatically replaced with the selected suggestion candidate and the resulting text entry is displayed. The method then proceeds back to process block 1220, where the updated text entry is checked for correctness again.

IX. Example Candidates on Demand Comprising Synonyms

Figure 13:
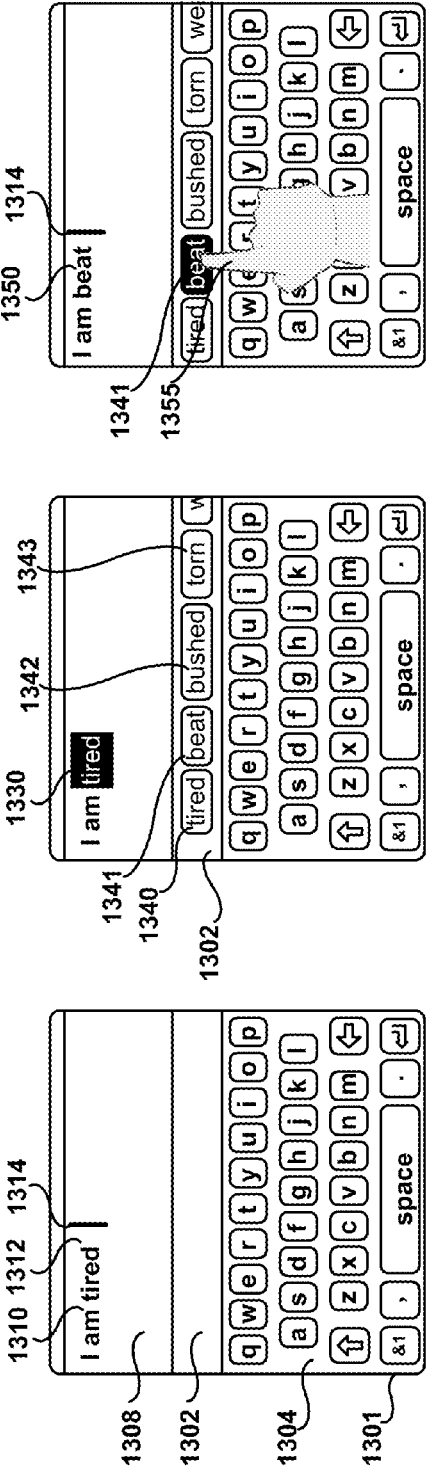
FIGS. 13A-C depict a method of providing candidates comprising presenting suggestion candidates to replace a word, where the suggestion candidates include synonyms for the selected word using a mobile device with a touch screen.
FIGS. 13D-F depict a method of providing candidates comprising presenting suggestion candidates as a user types, but before the user presses a delimiter key, and auto-correcting a word after the delimiter key is pressed using a mobile device with a touch screen.

FIGS. 13A-C illustrate another embodiment of the disclosed technology including a method 1300 of automatically presenting suggestion candidates for a selected word, including synonyms, upon demand. As shown in FIG. 13A, a text entry device 1301 includes a touch screen 1308, keyboard 1304, and suggestion candidates area 1302. As shown, a user has already entered the text input phrase "I am tired" 1310, including typing a space delimiter 1312, which appears before a carat 1314.

FIG. 13B shows the text entry device 1301 after the user has selected the word "tired" 1330 using a single touch screen input on the touch screen 1308. Immediately after receiving this input, the text entry device displays several suggestion candidates, including "tired" 1340, "beat" 1341, "bushed" 1342, and "torn" 1343, all of which are synonyms for the selected word "tired" 1330. For example, the synonyms can be generated using a suggestion module coupled with a thesaurus stored on the device, by accessing a database or application over a network, or by using rules stored on the text entry device.

Finally, FIG. 13C shows the text entry device 1301 as the user selects one of the suggestion candidates "beat" 1341 with a finger 1355, and the device immediately replaces the selected word "tired" with the associated word "beat" 1350.

Figure 14:
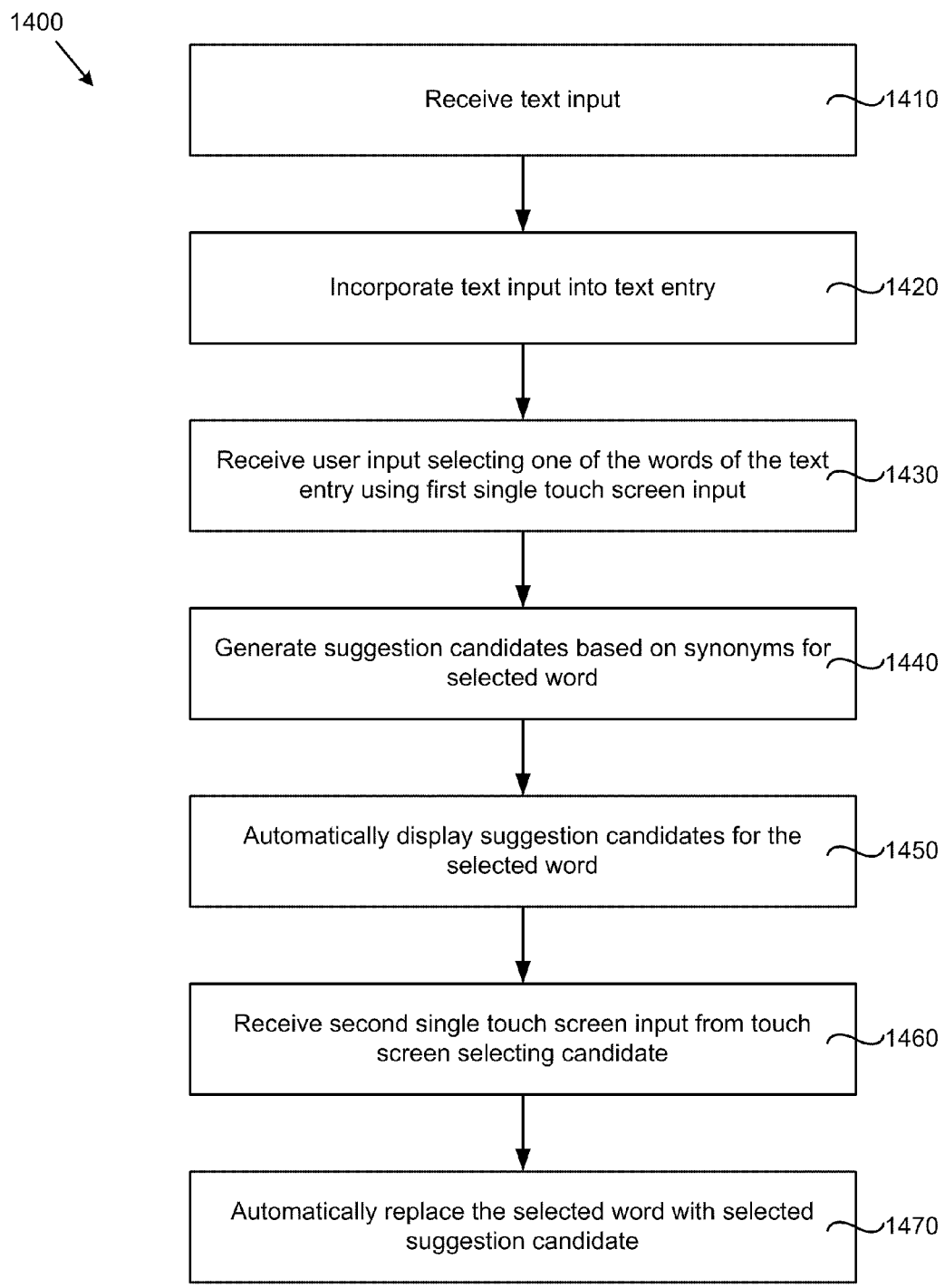
FIG. 14 is a flow chart that outlines an exemplary implementation of the method shown in FIGS. 13A-C.

FIG. 14 is a flow chart 1400 further detailing the method 1300 of providing suggestion candidates that are synonyms of a selected word upon demand shown in FIGS. 13A-13C. At process block 1410, text input is received and the method proceeds to process block 1420, where the text input is incorporated into a text entry. At process block 1430, user input is received selecting one of the words of the text entry with a single touch screen input located over a word. At process block 1440, suggestion candidates are generated, including candidates based on synonyms for the selected words. In some embodiments, alternate spellings for commonly misstyped or miss-spelled words can also be provided. For example, the suggestion candidates presented could include "they're" if the user has selected the word "their," or "affect" for "effect."The suggestion candidates are automatically displayed at process block 1450. The method waits to receive a second single touch screen input from the user over one of the suggestion candidates at process block 1460. Finally, at process block 1470, the selected word of the text entry is replaced with a word associated with the suggestion candidate selected at process block 1460.

X. Example Candidates on Demand using a Delimiter Key

FIGS. 13D-F illustrate another embodiment of the disclosed technology including a method 1360 of automatically presenting suggestion candidates for a word before a delimiter key is pressed. As shown in FIG. 13D, a text entry device 1361 includes a touch screen 1368, keyboard 1362 and suggestion candidates area 1370. A user has already entered the text input phrase "Would you like some ming" 1365, but has not yet typed a delimiter key, for example, the space key 1369, so the carat 1364 still appears directly next to the phrase. A correction module determines that the word "ming" of the phrase 1365 may be incorrect, and several suggestion candidates "mint" 1372, "ming" 1373, "mine" 1374, and "nine" 1375 are displayed in the candidates area 1370. By convention, the leftmost word "mint" 1372 is the word that will replace "ming" if the user types a delimiter key. The other suggestion candidates include the word "ming" of the phrase 1365, displayed with an add-to-dictionary indicator, and other suggestion candidates 1374 and 1375, which can also be selected.

FIG. 13E shows the text entry device 1361 as the user presses a delimiter key (here, the space key 1369) with a finger 1380.

Finally, FIG. 13F shows the text entry device 1361 after the device has replaced the word "ming" with the first candidate "mint," cleared the candidates area 1370, and advanced the carat 1364. As discussed further above, if instead of pressing the space key 1369, the user selects one of the candidates 1372, 1373, 1374, or 1375 in the candidate selection area 1370, the word "ming" would have been replaced with the selected suggestion candidate. If the user selects a candidate with an add-to-dictionary indicator (for example, "ming" 1373), the selected suggestion candidate would have been added to a dictionary of the text entry device 1361.

XI. Example Computing Environment

Figure 15:
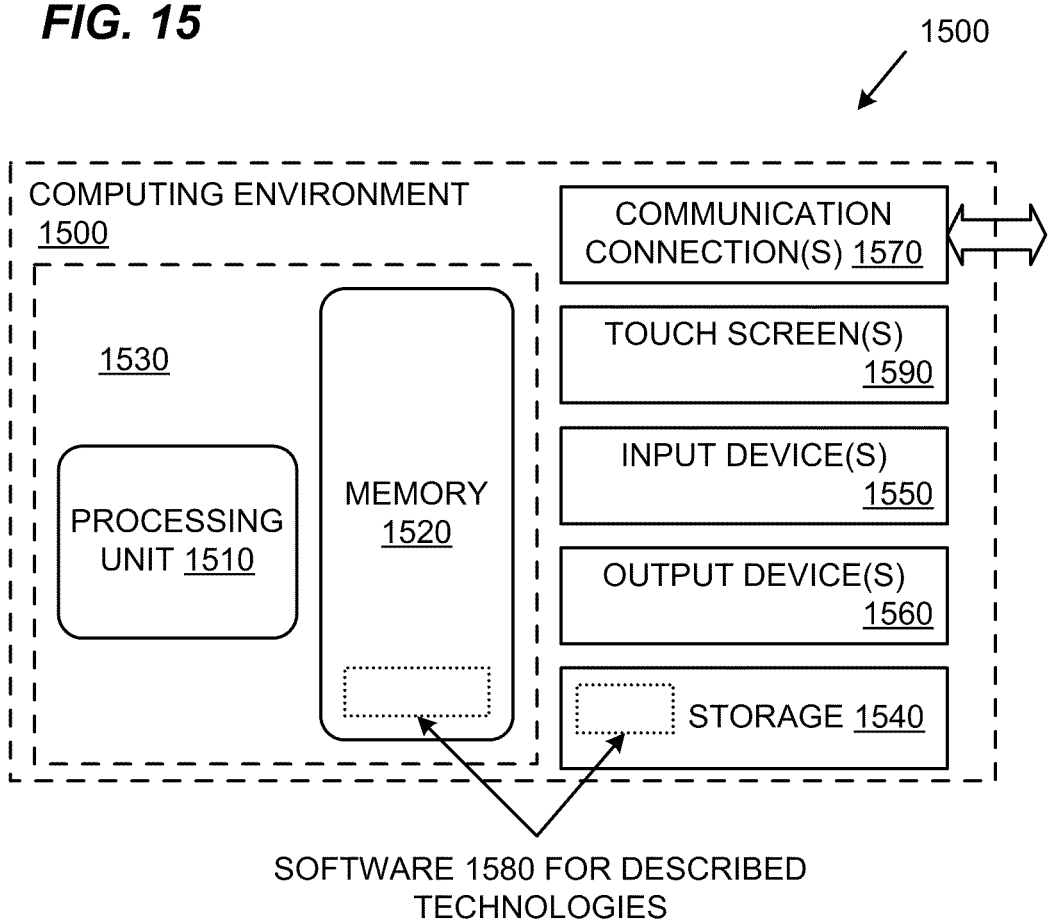
FIG. 15 illustrates a generalized example of a suitable computing environment in which described embodiments, techniques, and technologies may be implemented.

FIG. 15 illustrates a generalized example of a suitable computing environment 1500 in which described embodiments, techniques, and technologies can be implemented. For example, the computing environment 1500 can implement suggestion candidates, candidates on demand, candidates on demand using a delimiter key, auto-correction undo with candidates, add word to dictionary, context-based auto-correction, context-based spell-checking, or synonym suggestion candidates as described above.

The computing environment 1500 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 15, the computing environment 1500 includes at least one central processing unit 1510 and memory 1520. In FIG. 15, this most basic configuration 1530 is included within a dashed line. The central processing unit 1510 executes computer-executable instructions and may be a real or a virtual processor. In a multi-processing system, multiple processing units execute computer-executable instructions to increase processing power and as such, multiple processors can be running simultaneously. The memory 1520 may be volatile memory (e.g., registers, cache, RAM), non-volatile memory (e.g., ROM, EEPROM, flash memory, etc.), or some combination of the two. The memory 1520 stores software 1580 that can, for example, implement the technologies described herein. A computing environment may have additional features. For example, the computing environment 1500 includes storage 1540, one or more input devices 1550, one or more output devices 1560, one or more communication connections 1570, and one or more touch screens 1590. An interconnection mechanism (not shown) such as a bus, a controller, or a network, interconnects the components of the computing environment 1500. Typically, operating system software (not shown) provides an operating environment for other software executing in the computing environment 1500, and coordinates activities of the components of the computing environment 1500.

The storage 1540 may be removable or non-removable, and includes magnetic disks, magnetic tapes or cassettes, CD-ROMs, CD-RWs, DVDs, or any other medium which can be used to store information and that can be accessed within the computing environment 1500. The storage 1540 stores instructions for the software 1580, which can implement technologies described herein.

The input device(s) 1550 may be a touch input device, such as a keyboard, keypad, mouse, pen, or trackball, a voice input device, a scanning device, or another device, that provides input to the computing environment 1500. For audio, the input device(s) 1550 may be a sound card or similar device that accepts audio input in analog or digital form, or a CD-ROM reader that provides audio samples to the computing environment 1500. The output device(s) 1560 may be a display, printer, speaker, CD-writer, or another device that provides output from the computing environment 1500. The touch screen 1590 can act as an input device (receiving touch screen input) and as an output device (displaying the text entry area, suggestion candidates area, and/or touch keyboard).

The communication connection(s) 1570 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 1500. By way of example, and not limitation, with the computing environment 1500, computer-readable media include memory 1520, storage 1540, communication media (not shown), and combinations of any of the above.

Computer-readable media are any available media that can be accessed within a computing environment 1500. By way of example, and not limitation, with the computing environment 1500, computer-readable media include memory 1520 and/or storage 1540. As should be readily understood, the term computer-readable storage media includes the media for data storage such as memory 1520 and storage 1540, and not transmission media such as modulated data signals.

XII. Example Text Entry Device

Figure 16:
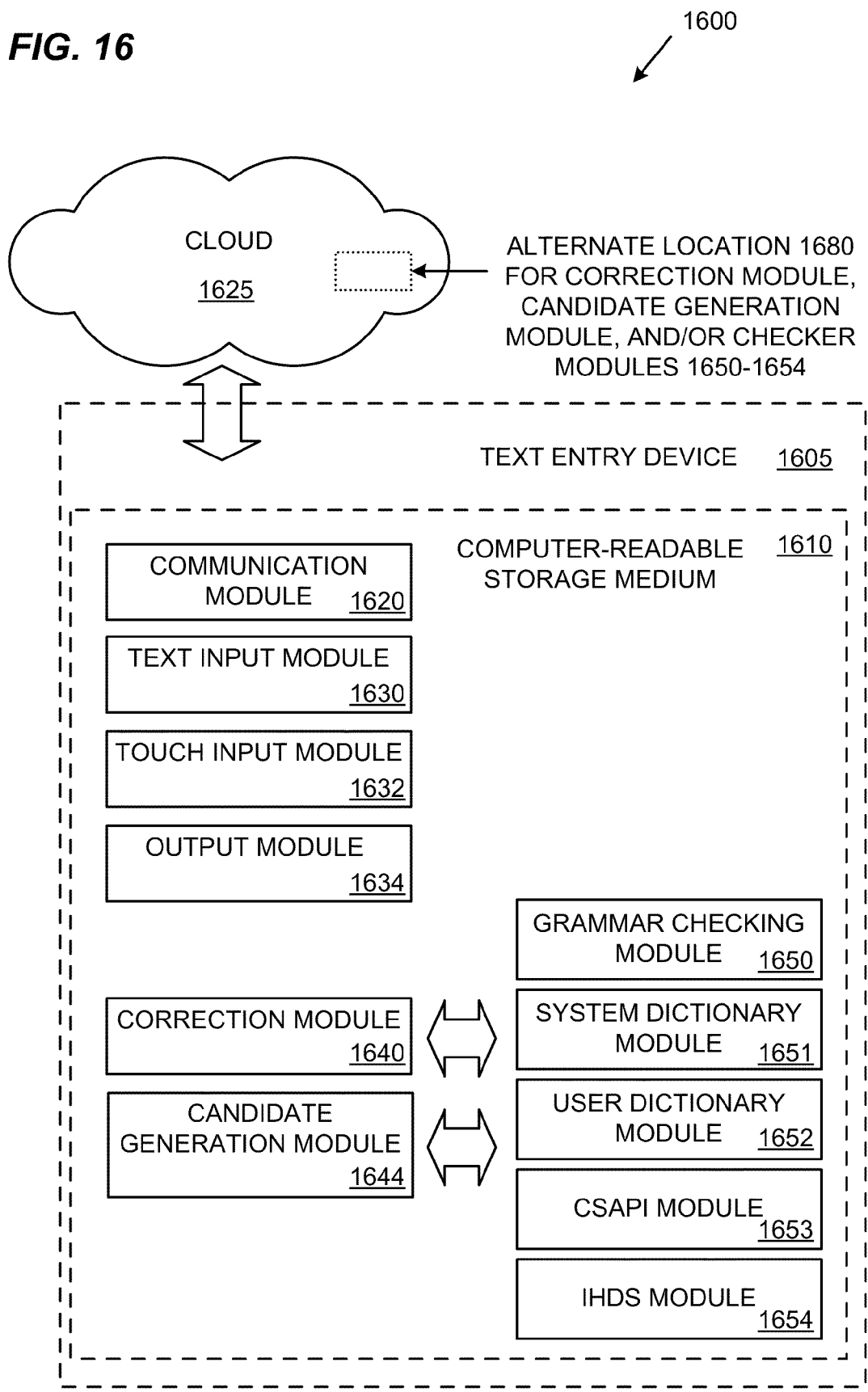
FIG. 16 illustrates a generalized example of a suitable implementation environment for a text entry device connected to a computing cloud.

FIG. 16 illustrates a generalized example of a suitable implementation environment 1600 of a text entry device 1605 connected to a computing cloud 1625. The text entry device 1605 includes several modules stored on a computer-readable storage medium 1610, including a text input module 1630 for receiving text entry input, touch input module 1632 for receiving touch screen input from a touch screen (not shown), and an output module 1634 for providing output to a touch screen. The communication module 1620 adapts the text entry device 1605 so that it can communicate with service providers located in the cloud 1625. The computer-readable storage medium 1610 also includes a correction module 1640 for checking and correcting text entries, and a candidate generation module 1644 for generating suggestion candidates. Correction module 1640 and candidate generation module 1644 can communicate with multiple modules to determine correction and suggestion candidates, including a grammar checking module 1650, a system dictionary module 1651, a user dictionary module 1652, a CSAPI (Common Speller API) module 1653, and an IHDS (input history data source) module 1654. In some embodiments, one or all of these source modules 1650-1654 can be provided by a service provider in an alternate location 1680 in the cloud 1625.

XIII. Example Implementation Environment

Figure 17:
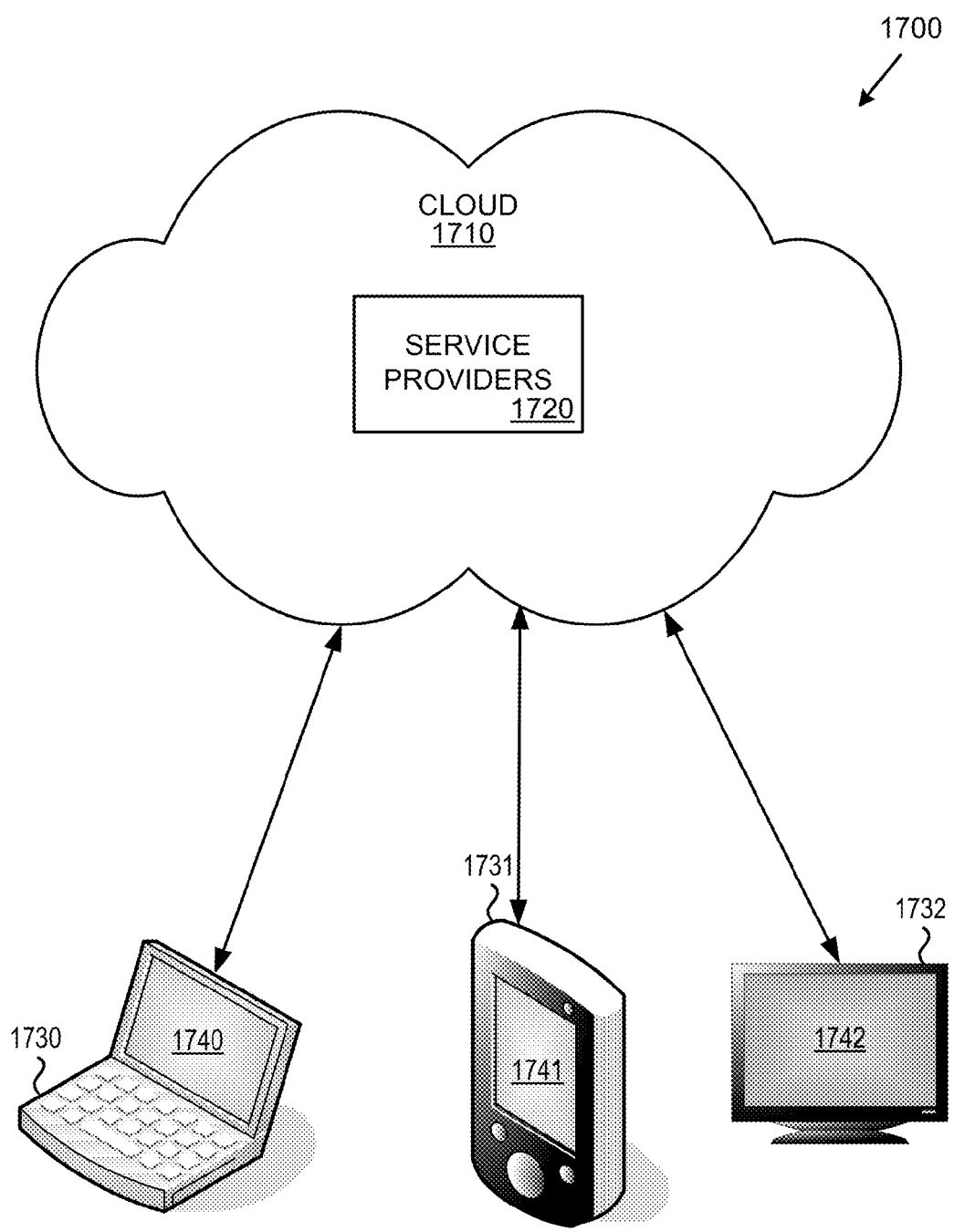
FIG. 17 illustrates a generalized examples of a suitable implementation environment including a computing cloud and various connected devices in which described embodiments, techniques, and technologies can be implemented.

FIG. 17 illustrates a generalized example of a suitable implementation environment 1700 in which described embodiments, techniques, and technologies may be implemented.

In example environment 1700, various types of services (e.g., computing services) are provided by a computing cloud 1710. For example, the cloud 1710 can comprise a collection of computing devices 1730, 1731, and 1732, which may be located centrally or distributed, that provide cloud-based services to various types of users and devices connected via a network such as the Internet. The implementation environment 1700 can be used in different ways to accomplish computing tasks. For example, some tasks (e.g., processing user input and presenting a user interface) can be performed on local computing devices (e.g., connected devices 1730-1732) while other tasks (e.g., storage of data to be used in subsequent processing, including candidate sources) can be performed in the cloud 1710.

In example environment 1700, the cloud 1710 provides services for connected devices 1730-1732 with a variety of screen capabilities. Connected device 1730 represents a device with a computer screen 1740 (e.g., a mid-size screen). For example, connected device 1730 could be a personal computer such as desktop computer, laptop, notebook, netbook, or the like. Connected device 1731 represents a device with a mobile device screen 1741 (e.g., a small size screen). For example, connected device 1731 could be a mobile phone, smart phone, personal digital assistant, tablet computer, and the like. Connected device 1732 represents a device with a large screen 1742. For example, connected device 1732 could be a television screen (e.g., a smart television) or another device connected to a television (e.g., a set-top box or gaming console) or the like. One or more of the connected devices 1730-1732 can include touch screen capabilities.

Touch screens can accept input in different ways. For example, capacitive touch screens detect touch input when an object (e.g., a fingertip or stylus) distorts or interrupts an electrical current running across the surface. As another example, touch screens can use optical sensors to detect touch input when beams from the optical sensors are interrupted. Physical contact with the surface of the screen is not necessary for input to be detected by some touch screens. Devices without screen capabilities also can be used in example environment 1700. For example, the cloud 1710 can provide services for one or more computers (e.g., server computers) without displays.

Services can be provided by the cloud 1710 through service providers 1720, or through other providers of online services (not depicted). For example, cloud services can be customized to the screen size, display capability, and/or touch screen capability of a particular connected device (e.g., connected devices 1730-1732).

In example environment 1700, the cloud 1710 provides the technologies and solutions described herein to the various connected devices 1730-1732 using, at least in part, the service providers 1720. For example, the service providers 1720 can provide a centralized solution for various cloud-based services (e.g., spelling data, grammar data, word frequency data, etc.). The service providers 1720 can manage service subscriptions for users and/or devices (e.g., for the connected devices 1730-1732 and/or their respective users).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

XIV. Example Mobile Device

Figure 18:
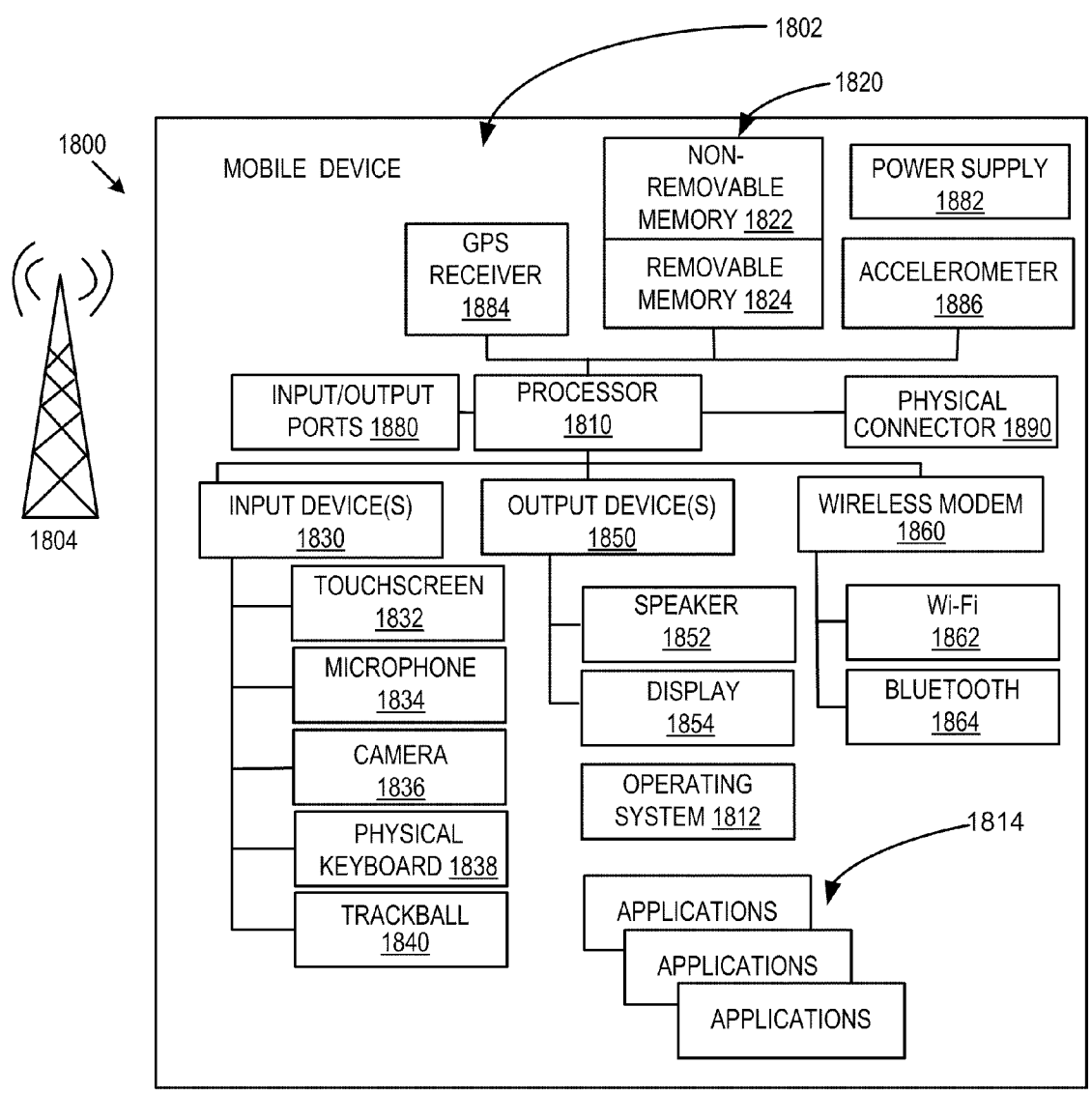
FIG. 18 is a system diagram depicting an exemplary mobile device, including a variety of optional hardware and software components.

FIG. 18 is a system diagram depicting an exemplary mobile device 1800 including a variety of optional hardware and software components, shown generally at 1802. Any components 1802 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1804, such as a cellular or satellite network. The mobile device 1800 can implement technologies including suggestion candidates, candidates on demand, candidates on demand using a delimiter key, auto-correction undo with candidates, add word to dictionary, context-based auto-correction, context-based spell-checking, or synonym suggestion candidates as described above.

The illustrated mobile device 1800 can include a controller or processor 1810 (e.g., signal processor, microprocessor, ASIC, or other control and processing logic circuitry) for performing such tasks as signal coding, data processing, input/output processing, power control, and/or other functions. An operating system 1812 can control the allocation and usage of the components 1802 and support for one or more application programs 1814. The application programs can include common mobile computing applications (e.g., email applications, calendars, contact managers, web browsers, text and media messaging applications) or any other computing application.

The illustrated mobile device 1800 can include memory 1820. Memory 1820 can include non-removable memory 1822 and/or removable memory 1824. The non-removable memory 1822 can include RAM, ROM, flash memory, a hard disk, or other well-known memory storage technologies. The removable memory 1824 can include flash memory or a Subscriber Identity Module (SIM) card, which is well known in GSM communication systems, or other well-known memory storage technologies, such as "smart cards." The memory 1820 can be used for storing data and/or code for running the operating system 1812 and the application programs 1814. Example data can include web pages, text, images, sound files, video data, or other data sets to be sent to and/or received from one or more network servers or other devices via one or more wired or wireless networks. The memory 1820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The memory 1820 can also be used for implementing the candidate sources, which are used for generating and suppressing auto-corrections and generation suggestion candidates. Candidate sources can include but are not limited to: a system dictionary, a user dictionary, a common speller application programming interface (CSAPI), touch models, and an input history data source.

The mobile device 1800 can support one or more input devices 1830, such as a touch screen 1832, microphone 1834, camera 1836, physical keyboard 1838 and/or trackball 1840 and one or more output devices 1850, such as a speaker 1852 and a display 1854. Other possible output devices (not shown) can include haptic output devices such as a piezoelectric transducer, or other suitable device. Some devices can serve more than one input/output function. For examples, touch screen 1832 and display 1854 can be combined in a single input/output device.

A wireless modem 1860 can be coupled to an antenna (not shown) and can support two-way communications between the processor 1810 and external devices, as is well understood in the art. The modem 1860 is shown generically and can include a cellular modem for communicating with the mobile communication network 1804 and/or other radio-based modems (e.g., Wi-Fi 1862 or Bluetooth 1864). The wireless modem 1860 is typically configured for communication with one or more cellular networks, such as a GSM network for data and voice communications within a single cellular network, between cellular networks, or between the mobile device and a public switched telephone network (PSTN). The mobile device can further include at least one input/output port 1880, a power supply 1882, a satellite navigation system receiver 1884, such as a Global Positioning System (GPS) receiver, an accelerometer 1886, and/or a physical connector 1890, which can include but is not limited to a USB port, IEEE 1394 (FireWire) port, and/or an RS-232 port. The illustrated components 1802 are not required or all-inclusive, as any components can deleted and other components can be added.

XV. Example Alternatives and Combinations

Any of the methods described herein can be performed via one or more computer-readable media (e.g., storage or other tangible media) comprising (e.g., having or storing) computer-executable instructions for performing (e.g., causing a computing device to perform) such methods. Operation can be fully automatic, semi-automatic, or involve manual intervention.

Having described and illustrated the principles of our innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope of the following claims and equivalents thereto.

We claim:

1. A method, comprising:
    receiving, with a text entry device, text input comprising one or more words, wherein at least a portion of the text input is displayed on a touch screen;
    receiving first touch screen input from the touch screen to select at least one of the words;
    based on the first touch screen input, selecting at least one of the words and displaying one or more suggestion candidates related to the at least one selected word, at least one of the suggestion candidates including the at least one selected word, the displaying including:
        displaying the at least one selected word within a shape designating an area of the touch screen as a button, and
        displaying an add-to-dictionary indicator within the button shape;
    receiving a second single touch screen input from the touch screen over a selected one of the suggestion candidates that includes the at least one selected word; and
    based on the receiving the second touch screen input, adding the at least one selected word associated with the selected suggestion candidate to a candidate source.

2. The method of claim 1, further comprising:
    modifying the text input by automatically replacing the at least one selected word with one or more words associated with the selected suggestion candidate;
    in response to the modifying the text input, checking the modified text input for correctness, wherein the checking comprises determining that a second word of the modified text input is incorrect; and
    highlighting the second word.

3. The method of claim 1, wherein the first touch screen input is a single touch screen input.

4. The method of claim 1, wherein the text input is received using a touch screen keyboard.

5. The method of claim 1, wherein the text input is received using a hardware keyboard.

6. The method of claim 1, wherein the text input is received using a speech recognition module.

7. The method of claim 1, wherein the suggestion candidates are displayed adjacent to a keyboard of the text entry device.

8. The method of claim 1, wherein the suggestion candidates are displayed adjacent to the at least one selected word.

9. A system comprising:
    one or more processing units operable to execute computer-executable instructions for text entry and correction;
    one or more memory units coupled to the processing units;
    one or more touch screens having a display area, the one or more touch screens operable to receive touch input over at least a portion of the display area;
    storage for storing the computer-executable instructions for text entry and correction using:
        a text input module for receiving text input;
        a text entry module for associating the text input with a text entry, wherein at least a portion of the text entry is displayed using the display area of the one or more touch screens;
        a touch screen input module for processing:
            first touch screen input received from the touch screens to produce at least one selected word of the text entry, wherein the at least one selected word is identified using the first touch screen input, and
            second touch screen input received from the touch screens to select one of one or more suggestion candidates;
        a candidate generation module for producing the suggestion candidates for the at least one selected word, at least some of the suggestion candidates being produced from a candidate source, wherein the at least one selected word is automatically displayed as one of the suggestion candidates adjacent to an add-to-dictionary indicator, the at least one selected word and the indicator being displayed within a shape designating an area of the touch screens display as a button, and wherein a correction module is operable to add one or more words associated with the selected suggestion candidate to the candidate source if the selected word suggestion candidate is selected with the second touch screen input.

10. The system of claim 9, further comprising a correction module for, if the selected suggested candidate is not the selected word, then automatically modifying the text entry by replacing the at least one selected word with a word associated with the selected suggestion candidate, the correction module being operable to add a word associated with the selected suggestion candidate to a candidate source.

11. The system of claim 9, wherein the text input module is a touch screen keyboard.

12. The system of claim 9, wherein the suggestion candidates are displayed adjacent to a touch keyboard area on the touch screen display area.

13. The system of claim 9, wherein the suggestion candidates are displayed adjacent to the at least one selected word on the touch screen display area.

14. One or more computer-readable storage media storing computer-executable instructions that when executed cause a computer to perform a method, the method comprising:
    receiving text input using a touch screen, the text input including one or more words;
    based on the text input, selecting at least one of the words and displaying one or more suggestion candidates including the at least one selected word, the displaying comprising displaying the selected word within a shape designating an area of the touch screen as a button including an add-to-dictionary indicator adjacent to the at least one selected word and within the button shape;
    receiving a second single touch screen input from the touch screen over the button; and
    based on the receiving the second touch screen input, adding the at least one selected word associated with the selected suggestion candidate to a candidate source.

15. The computer-readable storage media of claim 14, wherein one or more of the suggestion candidates are received from a common speller application programming interface.

16. The computer-readable storage media of claim 14, wherein one or more of the suggestion candidates are received from a service provider in a computing cloud.

17. The computer-readable storage media of claim 14, wherein:
    determining a rank order using one or more ranks received from one or more of the following: a system dictionary, a user dictionary, a common speller application programming interface, or an input history data source, wherein the suggestion candidates are arranged on the touch screen according to the rank order.

18. The computer-readable storage media of claim 14, wherein:
the selected suggestion candidate is a complete word; and
the selected suggestion candidate is added to a system dictionary, a user dictionary, a common speller application programming interface, or an input history data source.

19. The system of claim 9, further comprising a correction module for:
modifying the text input by automatically replacing the at least one selected word with one or more words associated with the selected suggestion candidate;
in response to modifying the text input, checking the modified text input for correctness, wherein the checking comprises determining that a second word of the modified text input is incorrect; and
highlighting the second word.

20. The computer-readable storage media of claim 14, wherein the method further comprises:
modifying the text input by automatically replacing the at least one selected word with one or more words associated with the selected suggestion candidate;
in response to the modifying the text input, checking the modified text input for correctness, wherein the checking comprises determining that a second word of the modified text input is incorrect; and
highlighting the second word.

21. The computer-readable storage media of claim 14, wherein at least one of the words is designated as a complete word based on receiving a delimiter character in the text input immediately after receiving input for the complete word, and wherein the method further comprises:
based on the receiving the delimiter character, modifying the text input by automatically replacing the complete word with a word associated with a highest ranked suggestion candidate.

22. The computer-readable storage media of claim 21, wherein the method further comprises:
before the receiving the delimiter character, displaying one or more suggestion candidates associated with the text input on the touch screen, the suggestion candidates being arranged on the touch screen according to a rank order.

* * * * *